United States Patent
Smith et al.

(10) Patent No.: US 11,796,714 B2
(45) Date of Patent: Oct. 24, 2023

(54) DETERMINATION OF MECHANICAL PROPERTIES OF A GEOLOGICAL FORMATION USING DEEP LEARNING APPLIED TO DATA ACQUIRED WHILE DRILLING

(71) Applicant: Saudi Arabian Oil Company, Dhahran (SA)

(72) Inventors: Robert Smith, Dhahran (SA); Rayan Kanfar, Stanford, CA (US); Andrey Bakulin, Dhahran (SA); Nasher Muqbel AlbinHassan, Dammam (SA); Philippe Nivlet, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/546,570

(22) Filed: Dec. 9, 2021

(65) Prior Publication Data

US 2022/0187493 A1 Jun. 16, 2022

Related U.S. Application Data

(60) Provisional application No. 63/123,745, filed on Dec. 10, 2020.

(51) Int. Cl.
*G01V 11/00* (2006.01)
*E21B 49/00* (2006.01)
(Continued)

(52) U.S. Cl.
CPC .......... *G01V 11/002* (2013.01); *E21B 49/003* (2013.01); *G01V 1/284* (2013.01); *G01V 5/12* (2013.01); *G06N 3/049* (2013.01)

(58) Field of Classification Search
CPC ........ G01V 11/002; G01V 1/284; G01V 5/12; G06N 3/049; E21B 49/003
See application file for complete search history.

(56) References Cited

U.S. PATENT DOCUMENTS

| | | | |
|---|---|---|---|
| 5,578,539 A | 11/1996 | Glaubitt et al. | |
| 8,082,104 B2 | 12/2011 | Reynal | |

(Continued)

FOREIGN PATENT DOCUMENTS

| | | |
|---|---|---|
| CN | 102575516 | 7/2012 |
| WO | WO 2018048934 | 3/2018 |

OTHER PUBLICATIONS

Pelletier et al., "Temporal Convolutional Neural Network for the Classification of Satellite Image Time Series," Feb. 26, 2019, MDPI Publication, vol. 11, Issue 5, pp. 1-25 (Year: 2019).*

(Continued)

*Primary Examiner* — Elias Desta
(74) *Attorney, Agent, or Firm* — Fish & Richardson P.C.

(57) ABSTRACT

Methods for determination of mechanical properties of geological formations using deep learning include receiving, by a computer system, data acquired during drilling a geological formation. The computer system generates features of the data acquired during drilling. The features are indicative of mechanical properties of the geological formation. The computer system segments the features of the data acquired during drilling into sequences readable by a trained temporal convolutional network (TCN). The computer system determines the mechanical properties of the geological formation using the TCN based on the sequences obtained from the features of the data. A display device of the computer system generates a graphical representation of the mechanical properties of the geological formation.

20 Claims, 16 Drawing Sheets

(51) Int. Cl.
*G01V 1/28* (2006.01)
*G01V 5/12* (2006.01)
*G06N 3/049* (2023.01)

(56) References Cited

U.S. PATENT DOCUMENTS

| | | | |
|---|---|---|---|
| 9,187,984 | B2 | 11/2015 | Usadi et al. |
| 9,297,251 | B2 | 3/2016 | Poitzsch |
| 9,659,239 | B2 | 5/2017 | Matsunaga |
| 9,747,393 | B2 | 8/2017 | Dasari |
| 10,132,162 | B2 | 11/2018 | Neale et al. |
| 10,242,312 | B2 | 3/2019 | Storm, Jr. |
| 10,424,312 | B2 | 9/2019 | Kordon et al. |
| 11,112,513 | B2 | 9/2021 | Khadhraoui et al. |
| 2013/0075161 | A1 | 3/2013 | Yang |
| 2015/0356403 | A1 | 12/2015 | Storm, Jr. |
| 2016/0307312 | A1 | 10/2016 | Sungkom |
| 2018/0075343 | A1 | 3/2018 | Van Den Oord et al. |
| 2019/0169986 | A1 | 6/2019 | Storm et al. |
| 2019/0180165 | A1 | 6/2019 | Vinyals et al. |
| 2019/0266501 | A1 | 8/2019 | Tavares |
| 2020/0088897 | A1 | 3/2020 | Roy et al. |
| 2020/0109618 | A1 | 4/2020 | Flanagan et al. |
| 2021/0140298 | A1* | 5/2021 | Bakulin ................ E21B 49/003 |

OTHER PUBLICATIONS

Armenta, "Identifying Inefficient Drilling Conditions Using Drilling-Specific Energy," ATCE 2008, SPE Annual Technical Conference and Exhibition, Denver, Colorado, Sep. 2008, 7:4409-4424, 16 pages.
Bai et al., "An empirical evaluation of generic convolutional and recurrent networks for sequence modeling," 2018, 14 pages.
Bergstra et al., "Algorithms for hyper-parameter optimization," In Advances in neural information processing systems, 2011, 2546-2554, 9 pages.
Breiamn, "Random Forests," Machine Learning, Oct. 2001, 45(1):5-32, 28 pages.
Esmaeili et al., "Experimental Evaluation of Real-Time Mechanical Formation Classification using Drill String Vibration Measurement," SPE-158933-MS, SPE Annual Technical Conference and Exhibition, Oct. 2012, San Antonio, Texas, USA, 13 pages.
Fenwick et al., "Quantifying asymmetric parameter interactions in sensitivity analysis: application to reservoir modeling," Mathematical Geosciences, 2014, 46(4):493-511, 19 pages.
Fisher et al., "All Models are Wrong, but Many are Useful: Learning a Variable's Importance by Studying an Entire Class of Prediction Models Simultaneously," Journal of Machine Learning Research, 2019, 20(177):1-81, 81 pages.
Gan et al., "Artificial Intelligent Logs for Formation Evaluation Using Case Studies in Gulf of Mexico and Trinidad & Tobago," In SPE Annual Technical Conference and Exhibition, Society of Petroleum Engineers, Sep.-Oct. 2019, 13 pages.
Gowida et al., "A Hybrid Artificial Intelligence Model to Predict the Elastic Behavior of Sandstone Rocks," Sustainability, Sep. 2019, 11(19):1-22, 22 pages.
Hareland et al., "Calculating Unconfined Rock Strength from Drilling Data," Proceedings of the 1st Canada—US Rock Mechanics Symposium—Rock Mechanics Meeting Society's Challenges and Demands, Vancouver, BC, Canada, May 2007, 2:1717-1723, 7 pages.
Hastie et al., "The Elements of Statistical Learning: Data Mining, Inference, and Prediction," Springer Science & Business Media, Nov. 2013, New York, 764 pages.
He et al., "Deep residual learning for image recognition," In Proceedings of the IEEE conference on computer vision and pattern recognition, 2016, 770-778, 9 pages.
Jamshidi et al., "Real-time Estimation of Elastic Properties of Formation Rocks Based on Drilling Data by Using an Artificial Neural Network," Energy Sources, Part A, Recovery, Utilization and Environmental Effects, Jan. 2013, 35(4):337-351, 16 pages.
Kanfar et al., "Real-Time Well Log Prediction From Drilling Data Using Deep Learning," IPTC Conference Paper, SPE 19693-MS, 2020, 12 pages.
Lutz et al., "Instantaneous Logging Based on a Dynamic Theory of Drilling," Journal of Petroleum Technology, Jun. 1972, 24(6):750-758, 9 pages.
Machperson et al., "A Framework for Transparency in Drilling Mechanics and Dynamics Measurements," SPE Annual Technical Conference and Exhibition. Houston, Texas, USA: Society of Petroleum Engineers, Sep. 2015, 28 pages.
Miah et al., "Machine Learning Approach to Model Rock Strength: Prediction and Variable Selection with Aid of Log Data," Rock Mechanics and Rock Engineering, Jun. 2020, 25 pages.
Moazzeni et al., "Artificial intelligence for lithology identification through real-time drilling data," Journal of Earth Science & Climatic Change, 2015, 6(3):1-4, 4 pages.
Myers et al., "Drillstring vibration: A Proxy for Identifying Lithologic Boundaries While Drilling," Proceedings of the Ocean Drilling Program, Scientific Results, 2002, 179, 17 pages.
Parapuram et al., "An artificially intelligent technique to generate synthetic geomechanical well logs for the Bakken Formation," Energies, 2018, 11(3):680, 26 pages.
Park et al., "DGSA: A Matlab toolbox for distance-based generalized sensitivity analysis of geoscientific computer experiments," Computers & geosciences, 2016, 97, 15-29, 15 pages.
Szegedy et al., "Going deeper with convolutions," In Proceedings of the IEEE conference on computer vision and pattern recognition, 2015, 1-9, 9 pages.
Teale, "The concept of specific energy in rock drilling," International Journal of Rock Mechanics and Mining Sciences & Geomechanics Abstract, Jun. 1972, 2(1):57-73, 17 pages.
Van den Oord et al., "Wavenet: A generative model for raw audio," Sep. 2016, 15 pages.
Wolcott et al., "Lithology Determination Using Downhole Bit Mechanics Data," SPE 26492, 68th Annual Technical Conference and Exhibition of the Society of Petroleum Engineers held in Houston, Texas, Oct. 1993, 10 pages.
Zhang et al., "Synthetic well logs generation via Recurrent Neural Networks," Petroleum Exploration and Development, 2018, 45(4):29-639, 11 pages.
PCT International Search Report and Written Opinion in International Application No. PCT/RU2019/000738, dated Jun. 3, 2020, 17 pages.
Jamshidi et al., "Real time estimation of elastic properties of formation rocks based on drilling data by using an artificial neural network," Energy Sources, Part A, Jan. 2013, 35(4):337-351, 17 pages.
Klyuchnikov et al., "Data driven model for the identification of the rock type at a drilling bit," Journal of Petroleum Science and Engineering, 2019, 24 pages.
Osarogiagbon et al., "Gamma ray log generation from drilling parameters using deep learning," Journal of Petroleum Science and Engineering, Sep. 2020, 195:107906, 17 pages.
PCT International Search Report and Written Opinion in International Application No. PCT/US2021/062599, dated Apr. 5, 2022, 15 pages.
Turingfinance.com [online], Reid, "10 misconceptions about Neural networks," Turing Finance, 2014, retrieved on Oct. 6, 2022, retrieved from URL <http://www.turingfinance.com/misconceptions-about-neural-networks/>, 25 pages.

\* cited by examiner

| LAYER | 1D FILTER SIZE | OUTPUT SHAPE | NUMBER OF PARAMETERS |
|---|---|---|---|
| Input | - | (50,5) | |
| Conv1D | 3 | (47,16) | 256 |
| Conv1D | 5 | (44,32) | 2592 |
| Max Pool (s=2) | 3 | (21,32) | 0 |
| Inception1* | 3 | (21,96) | 3104 |
| | 5 | | 5152 |
| | 7 | | 7200 |
| Conv1D | 1 | (21,32) | 3104 |
| Inception2* | 3 | (21,192) | 6208 |
| | 5 | | 10304 |
| | 7 | | 14400 |
| Conv1D | 1 | (21,64) | 12352 |
| Max Pool (s=2) | 3 | (8,64) | 0 |
| TCN* | 3 | (512,3) | 426 |
| Dense | - | 256 | 393472 |
| Dense | | 50 | 12850 |
| | | | Total: 471420 |

FIG. 5

DETERMINATION OF MECHANICAL PROPERTIES OF A GEOLOGICAL FORMATION USING DEEP LEARNING APPLIED TO DATA ACQUIRED WHILE DRILLING

CROSS-REFERENCE TO RELATED APPLICATIONS

This application claims the benefit of priority to U.S. Provisional Application Ser. No. 63/123,745, filed on Dec. 10, 2020, the entire contents of which are hereby incorporated by reference.

TECHNICAL FIELD

This description relates generally to determining properties of a geological formation, for example, mechanical properties of the geological formation.

BACKGROUND

Traditional methods used to drill wells are sometimes inefficient because of the drilling program design or missteps by a drilling crew. Inefficient drilling can result in extra rig time, the need to mitigate incidents, or a greater drilling cost.

SUMMARY

Methods for determining mechanical properties of a geological formation using deep learning include using a computer system to receive data acquired during drilling a geological formation. The computer system generates features of the data acquired during drilling. The features are indicative of mechanical properties of the geological formation. The computer system segments the features of the data acquired during drilling into sequences readable by a trained temporal convolutional network (TCN). The computer system determines the mechanical properties of the geological formation using the TCN based on the sequences obtained from the features of the data. A display device of the computer system generates a graphical representation of the mechanical properties of the geological formation.

In some implementations, the data acquired during drilling includes at least one of a Gamma Ray log, a rate of penetration, a number of revolutions per minute, a weight on bit, a stand-pipe pressure, a hook height, a hook load, fluid flow values, a type of a drill bit, near-bit vibrations, a rotational drilling speed, a mud motor speed, a drilling torque, an area of the drill bit, a temperature of a drilling mud, a weight of the drilling mud, a nozzle diameter of the drill bit, or a number of cutters of the drill bit.

In some implementations, the mechanical properties include at least one of compressional sonic properties, shear sonic properties, density of the geological formation, porosity of the geological formation, an unconfined compressive strength, a Young's modulus, or a Poisson's ratio.

In some implementations, the computer system performs sensitivity analysis on the features of the data acquired during drilling. The computer system ranks the features with respect to the mechanical properties of the geological formation based on the sensitivity analysis.

In some implementations, the computer system captures geologic patterns using a convolutional inception model applied to the sequences obtained from the features of the data. The outputs from the inception model are then fed into a TCN which learns to predict the mechanical properties of the geological formation.

In some implementations, the computer system trains the TCN to generate the mechanical properties of the geological formation based on the sequences obtained from the features of the data.

In some implementations, the computer system permutes at least one feature of the features of the data acquired during drilling. The computer system determines the change in the mechanical properties of the geological formation in response to permuting that feature, which is indicative of the feature importance.

In some implementations, the data acquired during drilling includes specific additional attributes computed from high-frequency recording of near-bit vibrations obtained with downhole tool or top-drive sensor recording vibrations transmitted through the drillstring. Such attributes may include but are not limited to Root-Mean-Square energy averaged over 5-500 seconds or any other frequency or temporal attribute computed using signal processing for a time series representing near-bit vibrations. Furthermore, such attributes can be computed separately for each frequency range. In addition, these attributes can be computed for each vibrations component (axial, radial, tangential, or X, Y, Z).

BRIEF DESCRIPTION OF THE DRAWINGS

FIG. 5 illustrates example layering, filter size, output shape, and a number of parameters, in accordance with one or more implementations.

DETAILED DESCRIPTION

Figure 1:
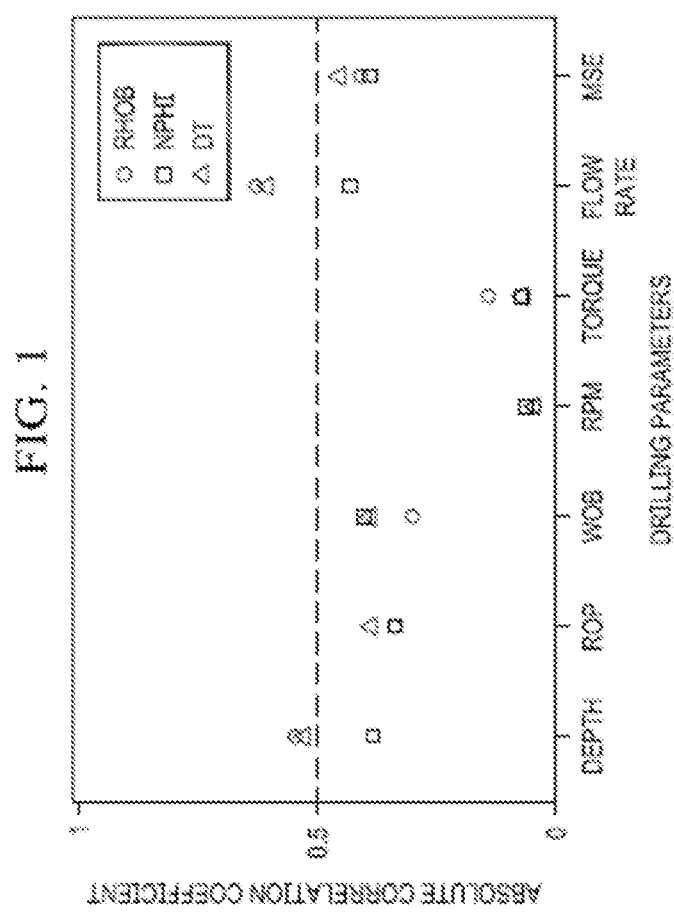
FIG. 1 illustrates an example correlation coefficient of drilling parameters with density, neutron-porosity, and sonic data, in accordance with one or more implementations.

The implementations disclosed provide methods, apparatus, and systems for determining mechanical properties of rocks or geological formations while drilling. In some implementations, the prediction is based on drilling parameters (surface, downhole, or both). In other implementations, logging while drilling logs, near-bit vibration data, other data, or a combination thereof are also used. Deep learning algorithms are used to predict the mechanical properties. Mechanical rock properties (such as velocity and density) are predicted from data acquired during drilling using a deep learning-based sequence modeling approach. Geophysical logs (such as density, porosity, and sonic data) are important for subsurface resource estimation and exploitation. However, these wireline petrophysical measurements are selectively deployed as they are expensive to acquire. Meanwhile, drilling information is recorded per drilled well, making it potentially a rich source of information about the subsurface properties. The implementations disclosed provide a predictive tool for wireline log prediction from drilling data to assist decisions about data acquisition, especially for delineation and production wells. The problem is non-linear with strong interactions between drilling parameters and other data recorded during drilling on one side and formation properties on the other side.

Among other benefits and advantages, the implementations disclosed provide a flexible and integrated framework for determining mechanical properties of a geological formation. The implementations provide improved analysis of data that is routinely acquired while drilling. The determination of the mechanical properties is achieved at a reduced cost compared to conventional methods. The implementations can be used to characterize the mechanical rock properties at the bit while drilling without the need for direct measurements, such as wireline acoustic logs. The information contained in the predicted mechanical logs can potentially be used to optimize the drilling if predicted in near real-time. The implementations can also be applied to automate the identification of boundaries between geological formations when only drilling parameters are available. The implementations can be applied to reservoir sections for which reduced-cost logging while drilling logs and drilling parameters can be used to obtain synthetic acoustic logs (mechanical property logs) without the need for acoustic logging while drilling logs or wireline logs. The implementations can also be applied to characterize overburden in a cost-effective manner for exploration. For example, generating synthetic logs and calibrating existing velocity models can be performed using reduced-cost substitutes in the form of drilling parameters, drilling parameters and logging while drilling logs, or drilling parameters and logging while drilling logs and near-bit vibrations. Moreover, the implementations disclosed herein increase the robustness of the mechanical property estimates during inefficient or suboptimal drilling when drilling measurements are dominated by noise from drilling dysfunctions.

FIG. 1 illustrates an example correlation coefficient of drilling parameters with density, neutron-porosity, and sonic data, in accordance with one or more implementations. In particular, FIG. 1 shows a correlation coefficient of drilling parameters with density, neutron-porosity, and sonic data. The horizontal dashed line shown is set to a correlation coefficient of 0.5. FIG. 1 implies that there is a reduced linear correlation between the drilling parameters and geophysical logs.

In some implementations, a computer system receives data acquired during drilling a geological formation. An example computer system is illustrated and described in more detail with reference to FIG. 10. The computer system predicts subsurface rock properties in wells (for example, oil wells, gas wells, survey wells, injection wells or geothermal wells) from real-time drilling data. The implementations are applicable to many different types of wells where drilling parameters, and ideally GR logs, are recorded. In some implementations, while the drilling data is acquired in real time, the predictions are not made in real time.

In some implementations, the data acquired during drilling includes one or more of a Gamma Ray (GR) log, a rate of penetration (ROP), a number of revolutions per minute (RPM), a weight on bit (WOB), a stand-pipe pressure, a hook height, a hook load, fluid flow values, a type of a drill bit, near-bit vibrations, a rotational drilling speed, a mud motor speed, a drilling torque, an area of the drill bit, a temperature of a drilling mud, a weight of the drilling mud, a nozzle diameter of the drill bit, or a number of cutters of the drill bit. The GR log obtained during drilling reflects properties of the surrounding rocks, rather than the drilling conditions. Drilling parameters are influenced by both rock properties and drilling conditions. Therefore, for the best predictions the GR log should be included as an input. In the disclosed implementations, the machine learning algorithms are used to train a regression model which transforms the input features (which can include GR and a number of drilling parameters) into a prediction of various mechanical or elastic properties, such as the compressional velocity.

Each formation can have different values of compressional velocity ("Vp"), rate of penetration ("ROP"), and mean specific energy ("MSE"). Compressional velocity is measured in units of kilometers (km) per second (s). Rate of penetration is measured in units of feet per hour. Mean specific energy is measured in units of kilopounds per square inch (ksi). "GR" denotes the intensity of passive Gamma Ray radiation measured by a logging while drilling tool in radioactivity units (api). Compressional velocity typically correlates to the mechanical properties of rocks. In some implementations, the data acquired during drilling includes specific additional attributes computed from high-frequency recording of near-bit vibrations obtained with downhole tool or top-drive sensor recording vibrations transmitted through the drillstring. Such attributes may include but are not limited to Root-Mean-Square energy averaged over 5-500 seconds or any other frequency or temporal attribute computed using signal processing for a time series representing near-bit vibrations. Furthermore, such attributes can be computed separately for each frequency range. In addition, these attributes can be computed for each vibrations component (axial, radial, tangential, or X, Y, Z).

The geophysical logs, such as density, porosity, and sonic logs are used for the subsurface resource estimation and exploitation. Wireline petro-physical measurements are selectively deployed because they are typically more expensive to acquire. Meanwhile, drilling information is usually recorded for every well drilled. Hence, the implementations described herein provide a predictive tool for wireline log prediction from drilling data to assist in decisions about data acquisition, especially for delineation and production wells. The implementations provide a solution to a non-linear problem with interactions between drilling parameters. Thus, deep learning is used to address this problem. Overall, a workflow for data augmentation and feature engineering using Distance-based Global Sensitivity Analysis (DGSA) is provided. An inception-based Convolutional Neural Network (CNN) combined with a Temporal Convolutional Network (TCN) is then used as the deep learning model. The model is designed to learn both low and high frequency content of the data.

Referring back to FIG. 1, drilling parameters are typically available per drilled well while wireline logs are deployed only selectively and are not available at all depths. In exploratory wells, more data is acquired at the well location compared to delineation or production wells. Hence, the implementations disclosed herein predict rock properties from drilling parameters, which can be used to assist with both real-time and non-real-time applications. The drilling parameters, such as ROP, WOB, bit size, RPM, torque, flow rate, and mechanical specific energy often have lower linear correlation with wireline data such as density, porosity, and sonic data, ranging from 0.2-0.55 in the example shown in FIG. 1. However, wireline logs are statistically sensitive to drilling parameters. Hence, there is a non-linear relationship between drilling parameters and density, porosity, and sonic data. Drilling parameters can be highly interactive with each other. Changes in some drilling parameters, such as pump pressure can affect other drilling parameters such as flow rate and rate of penetration. Since the relationship between drilling parameters and wireline logs is non-linear and interactive, deep learning is beneficial for learning the complex relationships.

Figure 2:
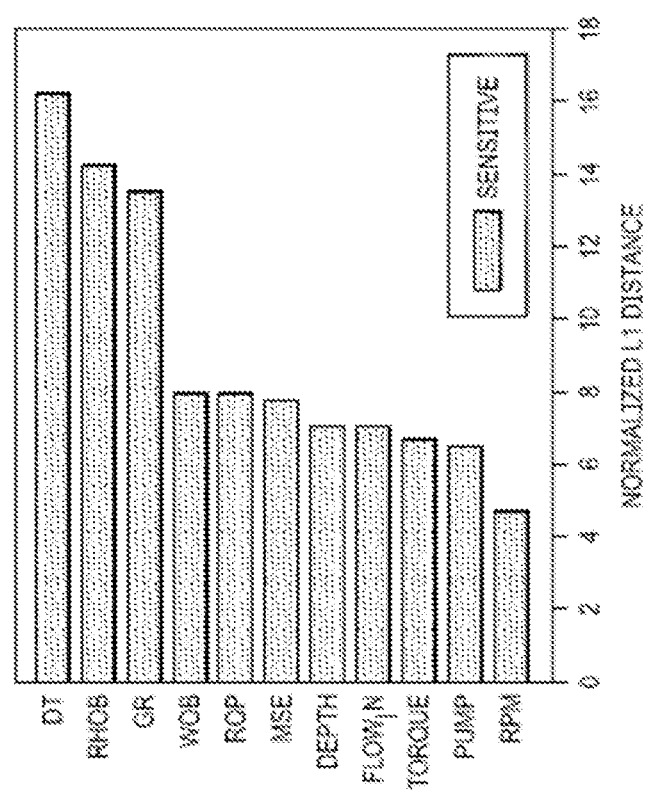
FIG. 2 illustrates an example distance-based generalized sensitivity analysis (GSA) sensitivity plot, in accordance with one or more implementations.

FIG. 2 illustrates an example distance-based generalized sensitivity analysis (DGSA) sensitivity plot, in accordance with one or more implementations. The workflow disclosed herein for wireline prediction from drilling parameters includes (1) feature engineering, (2) data processing and augmentation, and (3) architecture selection. In some implementations, the computer system generates features of the data acquired during drilling. The features are indicative of mechanical properties of the geological formation. The DGSA can be used to identify the features most influential to the response variable of interest. The goal of feature selection is to pick influential features to the predicted variables and remove redundant or irrelevant features in order to reduce the dimensionality of the problem. For example, highly correlated features are redundant because they exhibit the same underlying information and can be removed without any loss of information.

Some drilling parameters are constant values, such as bit size. To incorporate bit size in a meaningful way, the Mechanical Specific Energy (MSE) is used as a collective feature instead of bit size. MSE is determined from the drilling parameters and it is the energy required to drill a unit volume of rock. One equation used for MSE calculations is shown in equation (1), although different forms exist to account for various drilling conditions.

$$MSF = \frac{480 \cdot \text{Torque} \cdot RPM}{d_{bit}^2 ROP} + \frac{4WOB}{\pi d_{bit}^2} \quad (1)$$

Here, "WOB" denotes the weight on bit, "RPM" denotes the revolutions per minute, and "Torque" denotes the torque measured at the drilling rig.

In some implementations, the computer system performs sensitivity analysis on the features of the data acquired during drilling. In particular, FIG. 2 shows a DGSA sensitivity plot using neutron porosity as the response variable. The X-axis represents the L1 normalized sensitivity measure. Under a significance level of 0.05, any distance above 1 is considered "sensitive." DGSA is used to analyze the sensitivity of wireline logs to drilling data and select the optimal features for predicting each of the density, porosity, and sonic logs. FIG. 2 thus shows the sensitivity of porosity to drilling parameters and other wireline logs, such as density, gamma ray, and sonic data.

To analyze the sensitivity of the petrophysical logs to the drilling parameters and optimize the feature selection for training the deep learning network, DGSA can be conducted.

A distance between the total cumulative density function (CDF) is determined on a particular response variable and cluster CDFs of response variables based on varied input parameters. DGSA can be conducted for two purposes: 1) testing whether there is a relationship between drilling parameters and petrophysical logs, and 2) feature engineering: ranking the importance of drilling parameters for the prediction of a particular petrophysical log to save time when training and testing the network. The results in FIG. 2 show that there is at least a non-linear relationship between drilling parameters and geophysical logs. Under a rigorous statistical test, tornado plots show that geophysical logs are indeed sensitive to drilling parameters (for the specific dataset considered in FIG. 3) as well as its relative ranking of sensitivity.

In some implementations, the computer system ranks the features with respect to the mechanical properties of the geological formation based on the sensitivity analysis. The DGSA is performed as follows: 1) a response variable is selected, for example, porosity. 2) a suitable number of clusters is selected based on prior information of the interval under study. 3) the response is clustered. 4) the input variables are clustered (the drilling parameters) based on the indices of the clustered response variable. 5) the distance between clustered CDF and total CDF of each input variable is measured. 6) hypothesis testing is used to accept/reject sensitivity based on distance. 7) the interaction between parameters can be analyzed if inputs are conditioned to other inputs, and step 5) and 6) and repeated. The relative importance of the drilling parameters is shown in FIG. 2.

Figure 3:
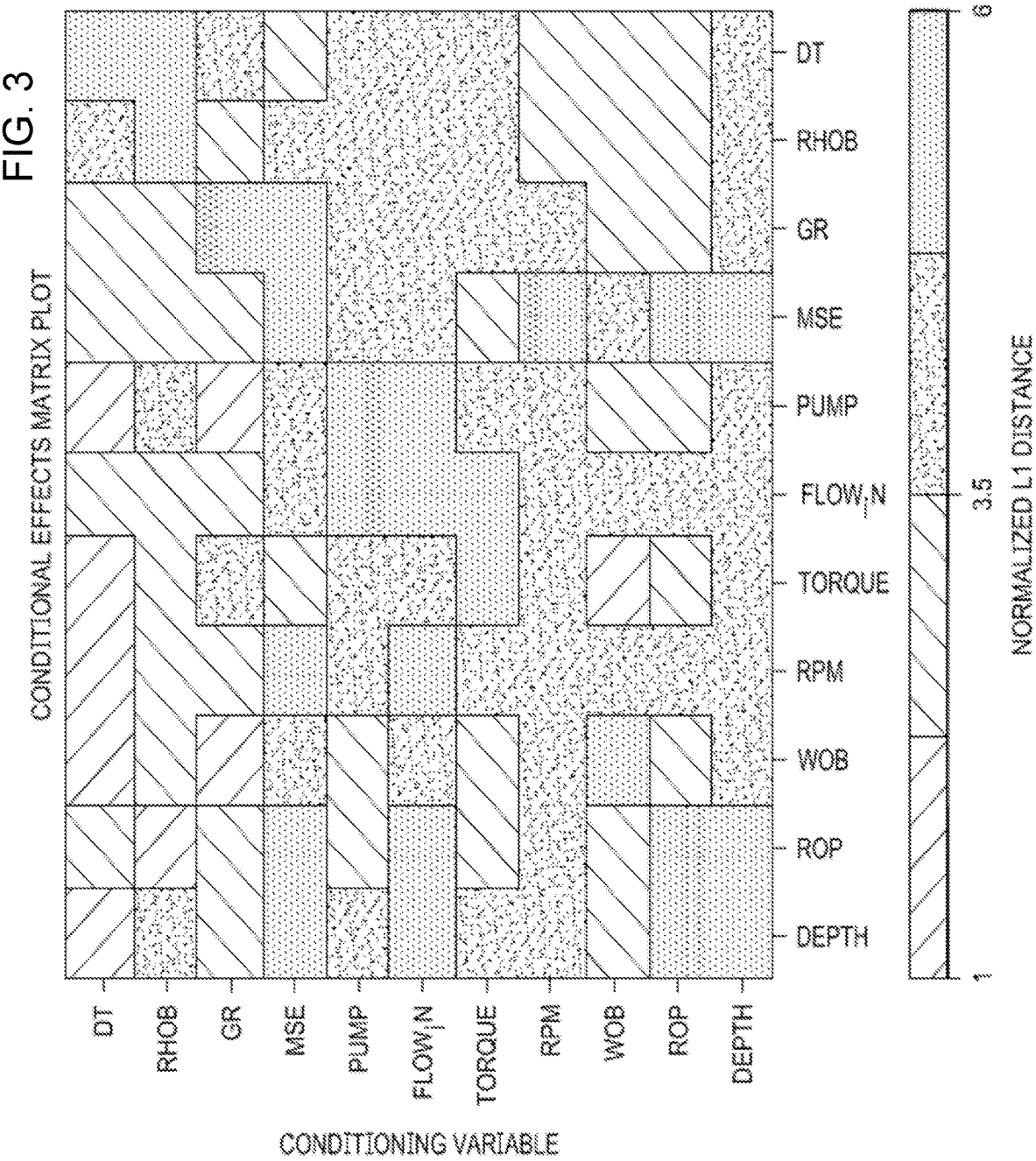
FIG. 3 illustrates an example interactive sensitivity of drilling parameters, in accordance with one or more implementations.
Figure 4:
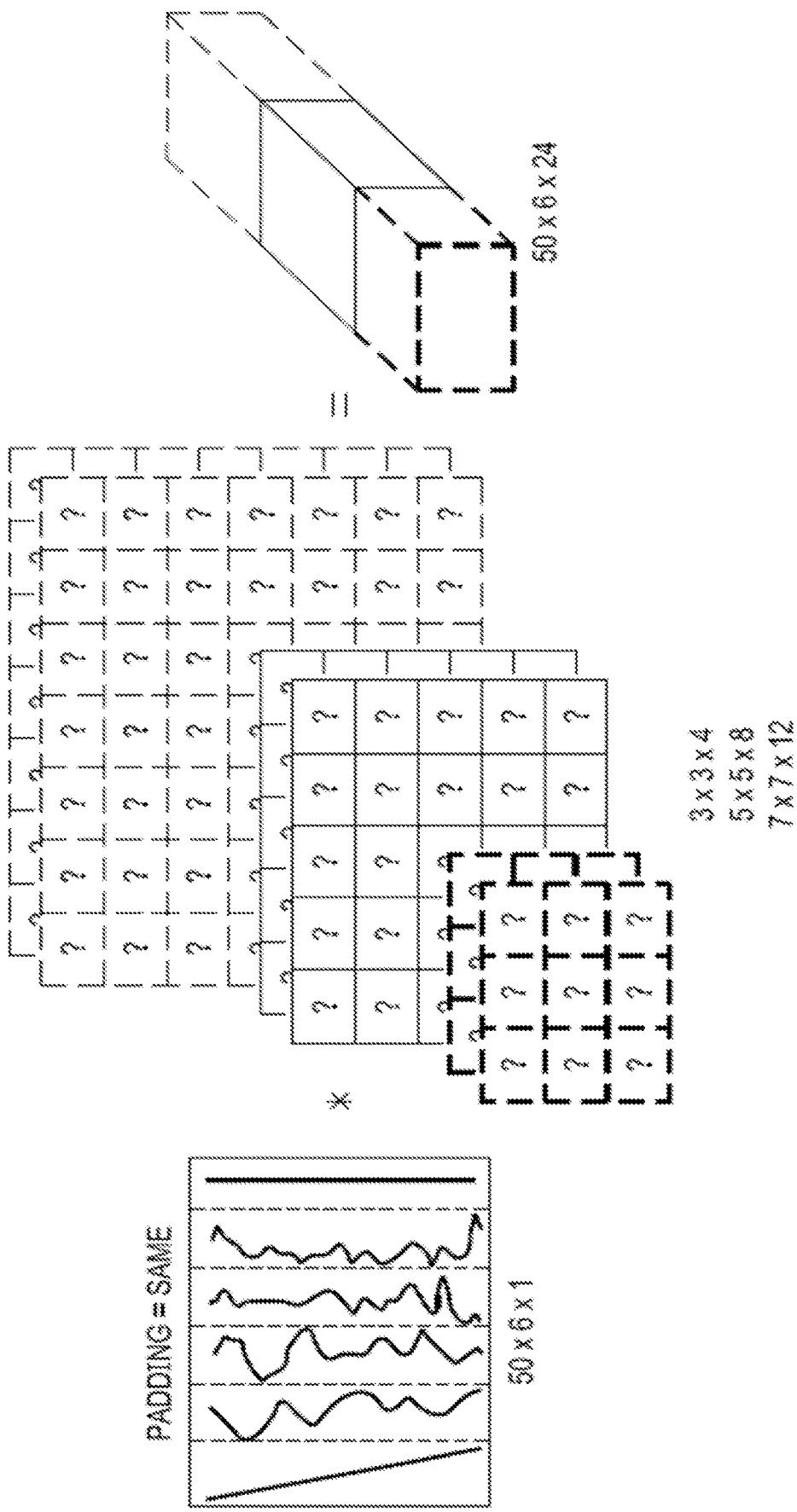
FIG. 4 illustrates example inception-based convolutions, in accordance with one or more implementations.

FIG. 4. illustrates an example interactive sensitivity of drilling parameters, in accordance with one or more implementations. In particular, FIG. 3 shows the interactive sensitivity of drilling parameters when porosity is the response variable. For example, porosity is most sensitive to sonic, density, and GR. It is also sensitive to drilling parameters, although less sensitive than wireline logs. The sensitivities of porosity to drilling parameters are almost the same for all parameters except RPM, which is found to be the least sensitive parameter (for this particular example).

The drilling parameters are sometimes controlled and only make sense when viewed together with other drilling parameters. For example, the drilling design might plan for the ROP to be a particular value over a certain period of time, while other parameters are changed to maintain the ROP planned by the drilling design. The ROP may not correspond to the compressional velocity despite the fact that compressional velocity typically indicates the elastic properties of a rock. The ROP may not correspond to the compressional velocity because of drilling inefficiencies during particular intervals when the drill bit is not fully engaged with the rock. In such intervals, the majority of the energy applied is not used for destruction of the rock. Sometimes, either a first parameter or a second parameter can be introduced (but not both) as a feature because the first parameter directly affects the second parameter. In other words, interactions between parameters can indicate redundancy of information. Thus, analyzing the interaction between features and their effect on the response variables is important for picking influential features. The interactive sensitivity plot using DGSA assists in decisions about this selection.

The diagonal of the conditional interactive sensitivity matrix plot is the sensitivity plot of FIG. 1. In general, the drilling parameters are highly interactive with each other but not when conditioning to wireline logs. However, all parameters are conditionally sensitive to depth. Additionally, flow rate and pump pressure are highly interactive.

The implementations described herein perform data pre-processing, including removal of missing data, extracting sequences of data and standardization. This is done after selection of the input features by the DGSA analysis. Several steps are applied to turn the raw data into a suitable form for training a sequence-to-sequence model, such as a TCN. In a first step, the drilling data and bit record (size and type) are resampled to the same as the well log. The conversion of the drilling parameters from time to depth typically results in them being placed on an irregular and/or finer grid than the corresponding well logs. The first step is to resample the drilling parameters so that they have the same depth sampling as the logs the computer system is predicting (typically 0.5 or 1 foot sampling).

In a second step, missing values are imputed and outliers are replaced. Missing values are a common issue for machine learning projects and need to be dealt with before training a neural network. A number of implementations can be used to replace these missing values, including simply using the mean/median of the input feature (taken from the training data) or to use the last valid value in the series. Areas having larger gaps in the data may need to be omitted for training. In a third step, outliers are replaced. Unrealistic values are also a common problem, particularly for the drilling parameters. The acceptable range for each input feature is defined (maximum and minimum allowed values). Values outside of the defined range are then capped to the limit.

In a fourth step, a binary column is added to indicate data that has been modified during processing. To enable the model to learn that replaced values are more uncertain, a binary feature is added for each input. This takes on a value of zero if the original measurement is used and one if it is replaced. In a fifth step, additional features can be added. Although deep neural networks are capable of learning complex relationships between input features, it makes sense to include engineered features that may help the network converge to a useful solution. One example is the mechanical specific energy (MSE), which is the energy required to drill a unit volume of rock. Ideally, the MSE is close to the unconfined compressive strength (UCS) of the rock which means that most of the drilling energy is spent on crushing the rock.

In a sixth step, one-hot encoding of categorical features is performed. If any categorical features exist in the inputs (for example, bit type) they are converted, so that only numerical data remains. One-hot encoding can be used so that a binary column is created for each unique category (such as each unique bit type) to specify if it is present (1) or not (0). In a seventh step, input features are normalized so that each of the input features spans the same range. Using features of different orders of magnitude can cause issues when training the model, where large values will dominate. In the case where the features have an approximately normal distribution, standardization is applied. In the case that the features do not have a normal distribution, normalization is applied which places each feature into the range [0, 1].

In an eighth step, sub-sequences are generated. The computer system segments the features of the data acquired during drilling into sequences readable by a trained TCN. Rather than use one long sequence from each well as input to the model, the data is segmented into many smaller sequences. First, using one long sequence for each well would result in a very small number of samples for training, which is insufficient to train the deep neural network. Second, as the distance from the drill bit increases, the less relevant the information becomes. In experiments, a 50-sample sliding window was used (corresponding to 25 feet) to extract overlapping mini-sequences from the wells, which was both geologically meaningful and would enable the network to better find patterns in the noisy drilling data. The output of this step is a number of arrays of data that can be used to train the neural network. The first array contains multivariate input sequences (for example GR and drilling parameters for one implementation) while the second contains sequences of the target to predict (density, sonic logs, or other logs). The target array can either be univariate or multivariate. The input and target arrays are typically split into training and validation datasets, with the validation data being used to evaluate the generalization of model as it is not used during training.

The processed data can then be used to train a model. The computer system trains the TCN to generate the mechanical properties of the geological formation based on the set of input sequences. The use of stacked 1D dilated convolutions enable the TCN to build a large receptive field (the size of the input that affects a particular feature or output) using only a few layers. With conventional 1D convolutions, the receptive field of the network grows linearly with the number of convolutional layers. Dilated convolutions essentially skip values in the input to apply the convolution filter over a size larger than the filter length (see FIG. 5). This is controlled by the dilation factor (d). A dilation factor of d=1 is normal convolution, while d=4 means that only every fourth value is used by the filter (three input values are skipped). The dilation factor can increase exponentially (d=1, 2, 4, 8 . . . ), which results in the receptive field also increasing exponentially for a fixed filter width (in this example the filter size is two).

A TCN typically represents a family of architectures that take a sequence of any length and map it to another sequence of the same length using causal (outputs are only dependent on earlier time-steps) convolutions. In the disclosed implementations, TCNs are used in a more general sense. First, the inputs do not need to be in time, they just need to be in the form of a regularly sampled sequence (in this case, in depth). Second, the requirement for causal convolutions is only necessary in the case of real-time predictions. A causal convolutions (where predictions can use future "time" samples) are appropriate in the case of non-real-time applications. The most important component is the use of dilated convolutions.

Each layer in the stack of dilated convolutions is often implemented as a residual (or temporal) block. Here the output from the previous layer splits into two paths. The first typically passes through a series of dilated convolutions (which are simple linear matrix transformations plus translation) followed by a nonlinear activation function to allow the network to learn complex relationships between the input and output features. The rectified linear unit (ReLU), which simply outputs the input value if positive or zero if negative, is often implemented for this purpose. Weight normalization and spatial dropout may also be included to improve model generalization. This sequence can be repeated several times in each residual block. The second path skips this entirely and is added back to the output of the residual block. The use of residual connections enable information to be passed through the network and improve backpropagation performance.

In some implementations, the computer system trains the TCN to generate the mechanical properties of the geological formation based on the sequences obtained from the features of the data. A model architecture utilizing these temporal convolution blocks can be followed by several dense layers before the output prediction. The neural network is trained to take mini-batches of the input sequences (such as ROP, RPM, or GR) and output sequences corresponding to the predicted log (such as density or velocity). Neural networks learn the values of weights in the network through gradient descent-based optimization techniques. However, various parameters must be set before the model can be trained. These are referred to as model hyper-parameters and include variables which define the structure of the network (such as a number of convolutional layers or a number of filters) and variables which control how the model learns (for example, a learning rate, a batch size, or a momentum). Finding a good set of hyper-parameter values is often important to obtaining good network performance.

To select an optimal set of hyper-parameters, different strategies may be used for minimal validation loss: (1) a systematic exploration of all potential combinations of hyper-parameters, also referred to as grid search; (2) a random exploration of all potential combinations of hyper-parameters, also referred to as random search; (3) focused exploration of hyper-parameters, where the algorithm learns to recognize regions of the hyper-parameter space where the loss is more likely to be small and focuses on these regions. Based on a choice of all these hyper-parameters, the neural network sequentially takes a random mini-batch of data, gives a corresponding vector of output TWT sequence lengths, and compares it to the expected vector of sequence lengths. The measure of discrepancy (also called loss) can be the mean absolute difference, or mean squared difference, even though other measures are possible. The neural network then automatically modifies its internal weights using a back-propagation algorithm in order to decrease the discrepancy.

Once an optimal set of hyper-parameters is found, the network is retrained using this set of hyper-parameters. Training and validation loss show the quality of the network while the evaluation of the network on the test dataset allows an estimation of the generalization potential of the network. The output of the step is then a calibrated network which takes as input a sequence of measured made while drilling (in depth) and predicts the required geomechanical logs.

In some implementations, a convolutional inception model can be applied prior to the TCN to help the model to capture geologic patterns at different scales. The inception model is a regular CNN that has layers that maintain a convolutional output shape that is similar to the input shape. This is done by padding the input with the mean, which in this case is zero. In particular, FIG. 4 shows that "same" padding ensures that the output has the same dimensions as the input, which can be concatenated as shown. The third dimension shown in FIG. 4 is the number of filters used because the data is standardized. Hence, multiple-sized filters are convolved with the input and multiple outputs of similar size are generated. The output volumes are concatenated to generate one deep volume as shown in FIG. 4. The inception model makes the network deeper by going wider instead in order to avoid vanishing gradients. The implementations disclosed herein thus capture geologic patterns at different scales by convolving the input with different sized filters.

The trained model outputs small subsequences of the log (such as 25-50 foot sections). Therefore, the predictions from multiple subsequences need to be combined to produce a prediction of the entire log. To do this a sliding window (with length equal to the window size used during training) with a stride of one is used to extract input sequences to pass into the trained model. The log is predicted 50 times (for a window size of 50 samples) for each depth sample. The mean of all the predictions is used to produce the final synthetic log. Alternative average methods can also be used, such as a weighted average or simply taking the last value of each output sequence.

An optional final step is to compute the permutation feature importance which can assist an understanding of how the model came to its prediction. The trained model is used to make predictions after randomly shuffling the data for one of the input features (for example, the ROP). An increase in prediction error (mean squared error in this case) is measured resulting from permuting the feature's values. Performing the step for a feature that the model has learned to be important breaks the relationship between it and the output, which results in a large increase in model error. Shuffling a feature that is not important should have little effect on the error. The permutation feature importance measures how important a feature is for that particular trained model. To provide an understanding of the feature's importance as a function of depth in each well, a similar approach is applied to produce a sample-based permutation feature importance. The change in the sample-based prediction error is measured, meaning that MSE is not used. Instead, a change in normalized absolute error is determined.

FIG. 5 illustrates example layering, filter size, output shape, and a number of parameters, in accordance with one or more implementations (in this case where the inception network is applied prior to the TCN). A one-dimensional (1D) convolution instead of a two-dimensional (2D) convolution is implemented by treating the drilling features as channels. 2D convolutions are more biased and computationally expensive due to the required padding across the input image to implement the inception model. A number of filters are used across the network that are 1×1 in size to reduce the dimensionality and number of parameters by reducing the number of filters in the output. The details of the empirically optimized network for the drilling problem are shown in FIG. 5. The inception layers are empirically found to be best placed in the middle of the network after resolving for lower-level features with cascaded convolutions to the input. In particular, FIG. 5 shows details of the architecture, including layering, filter size, output shape, and the number of parameters. Each inception module includes three convolutions of different filter sizes. The output of the inceptions are concatenated to generate the output shape. The TCN layer consists of one residual block with dilations set to be [1, 2, 4, 8, 16, 32], one per layer. The number of dilations needed depends on the length of the input sequences.

Figure 6:
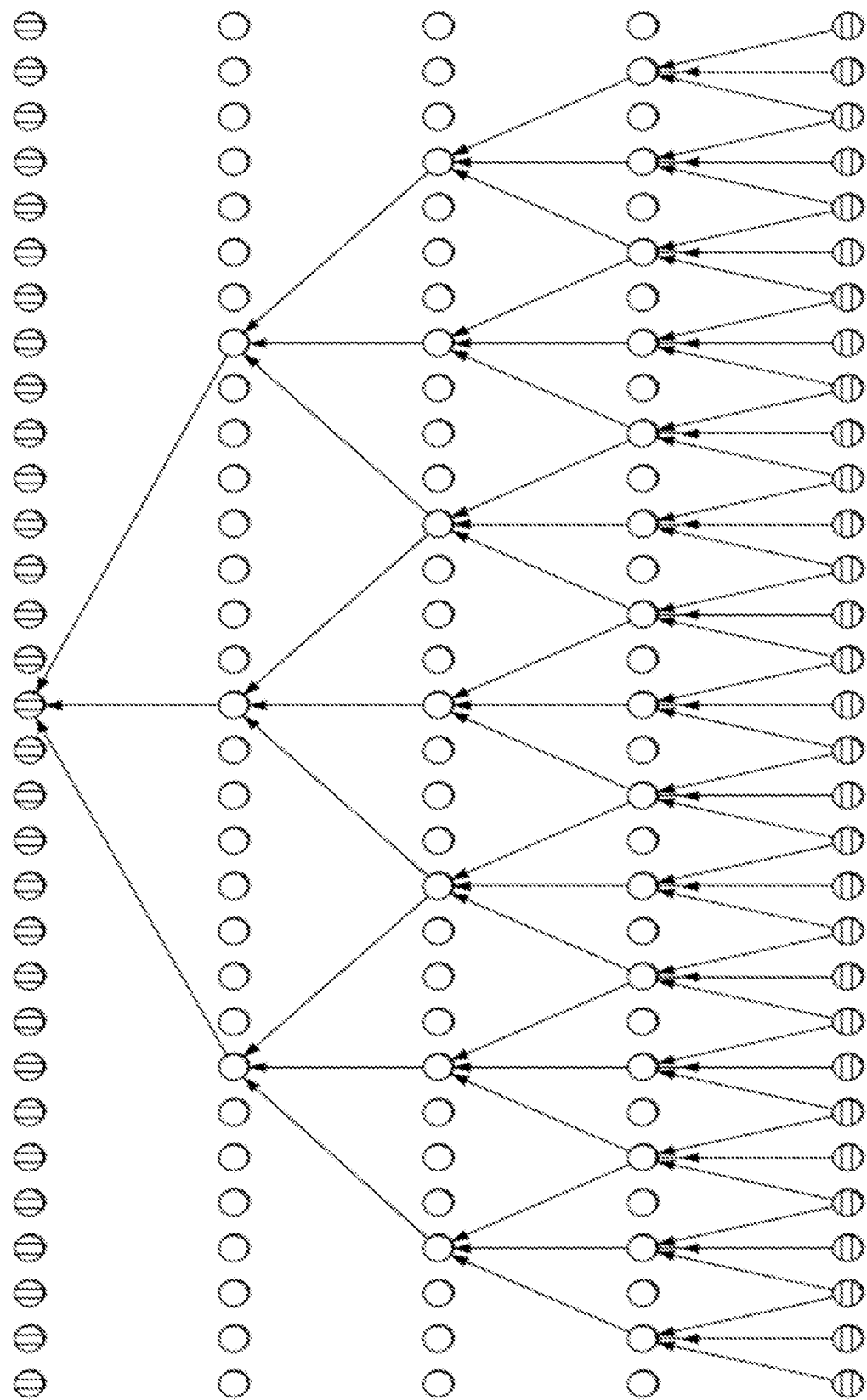
FIG. 6 illustrates an example block of a non-causal TCN, in accordance with one or more implementations.

FIG. 6 illustrates an example block of a non-causal TCN, in accordance with one or more implementations. The inception-based CNN is followed by a TCN. In some implementations, the computer system segments the features of the data acquired during drilling into sequences readable by a trained TCN. In experiments, sequence-based models, such as TCNs and long short-term memory (LSTM) models tend to learn the higher-frequency patterns in the data but not the lower frequencies. The opposite is true for regular CNNs and inception-based CNNs. Here, the two models are combined in the implementations disclosed. TCNs are used in preference to LSTM because TCNs are more stable to train.

In some implementations, the TCN model is a 1D convolutional network that uses residual blocks and dilated convolutions. "Dilation" refers to a number of data points in the input are skipped when the cross-correlation is determined. The dilations can be set to increase exponentially with depth, thereby increasing the receptive field of the activations. This approach increases the networks memory access in long sequences. A TCN is initially implemented to be causal with no memory leaks from the future to the past. It is designed to predict the future using only the past. In other words, every step depends on the previous steps only. Modifications can be made to use the future and past to predict each time-step as shown in FIG. 6. In particular, FIG. 6 shows a block of a non-causal TCN, where the output activations depend not only on the past, but also on the future. The filter size above is 3 and the dilation is [1 2, 4 8].

Figure 7A:
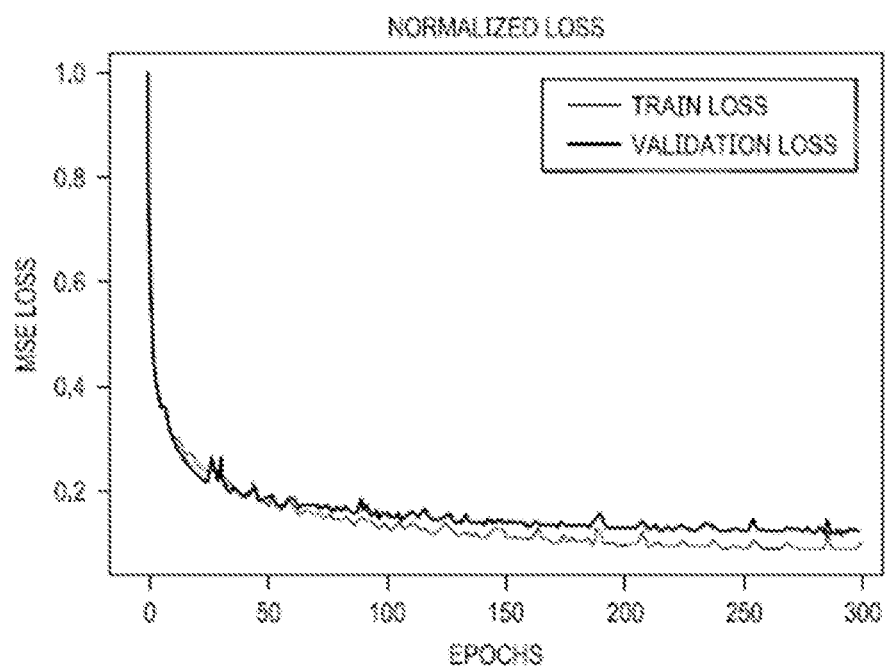
FIGS. 7A-7C illustrate example performance of an inception-based convolutional neural network (CNN) on test data, in accordance with one or more implementations.
Figure 7A:
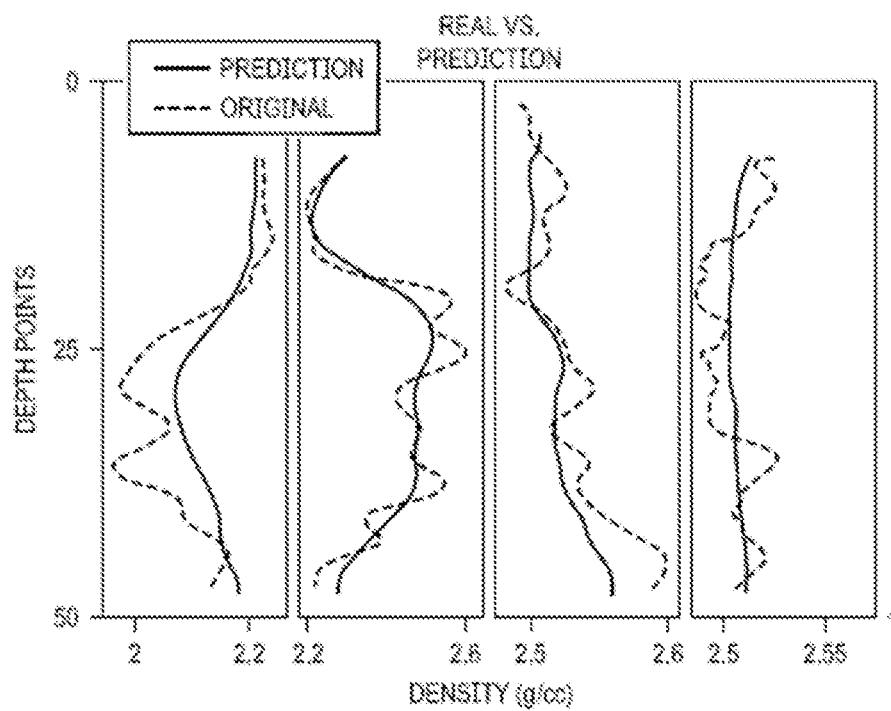
Figure 7B:
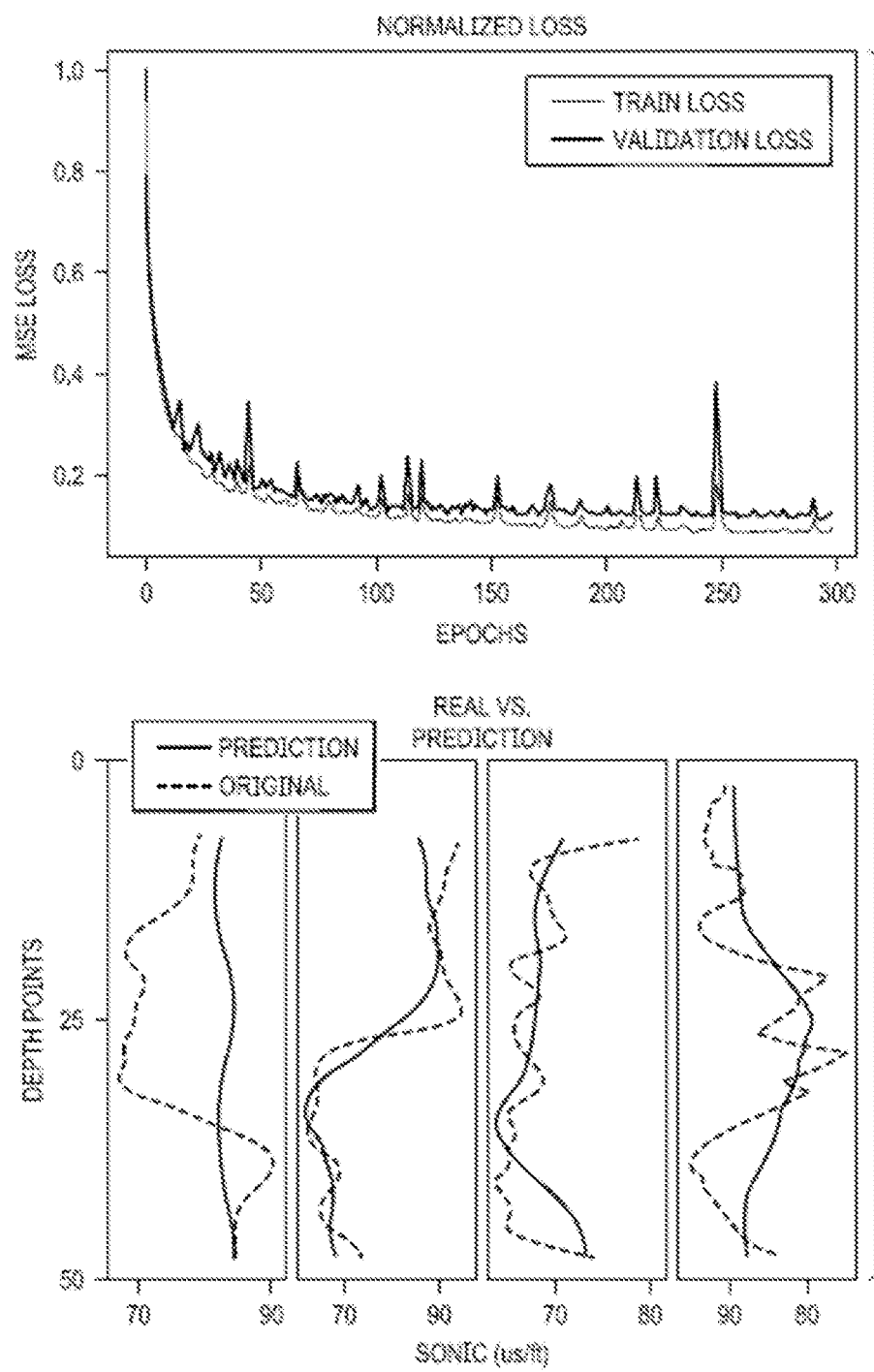
Figure 7C:
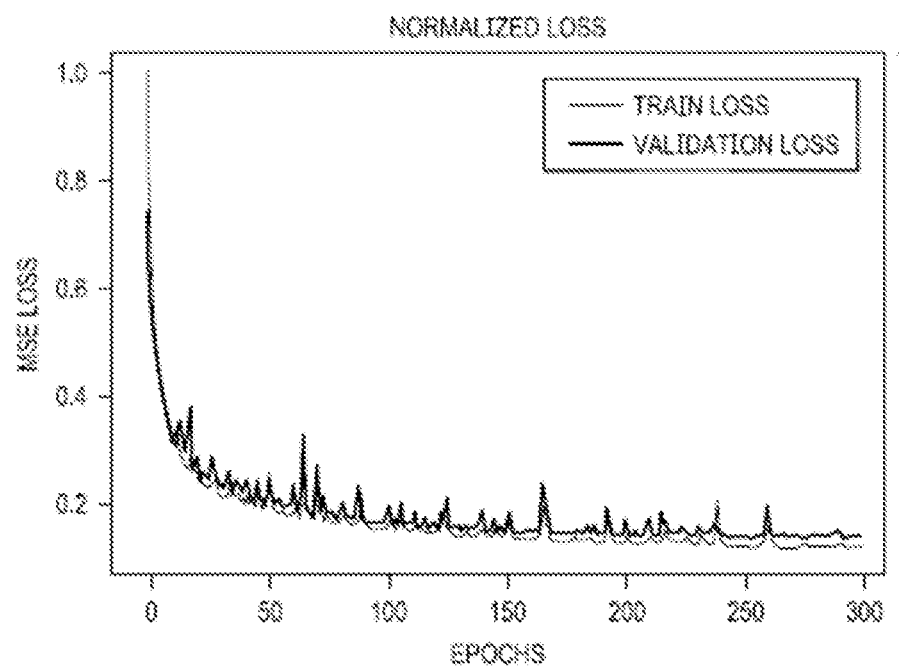
Figure 7C:
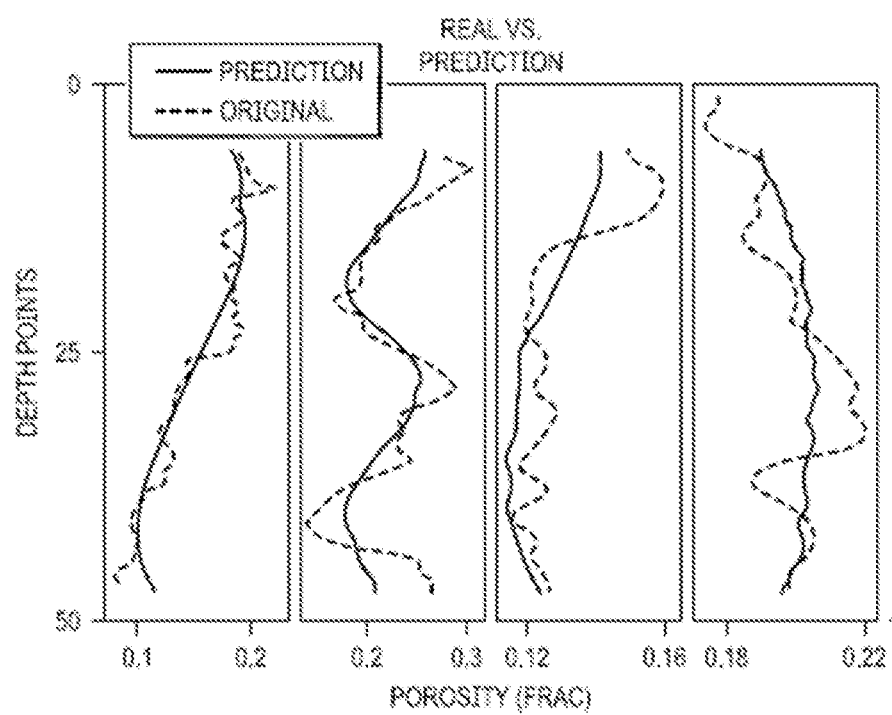

The predictions in FIGS. 7A-7C show that the inception-based CNN mostly learns the lower frequencies of the data. Following the network with a sequence-based model, in this case a TCN block, the higher frequencies are also used. This result was hypothesized based on the results of TCN and LSTM models where only the higher frequencies were learned from the data. The outputs initially appear to be random noise, but the hypothesis was tested by combining the two networks. One explanation for sequence models mainly learning higher frequencies is that the optimized weights in the LSTM and TCN models are shared across the whole network. In other words, because of the memory property, the network tries to optimize predictions that have higher receptive fields.

Figure 8A:
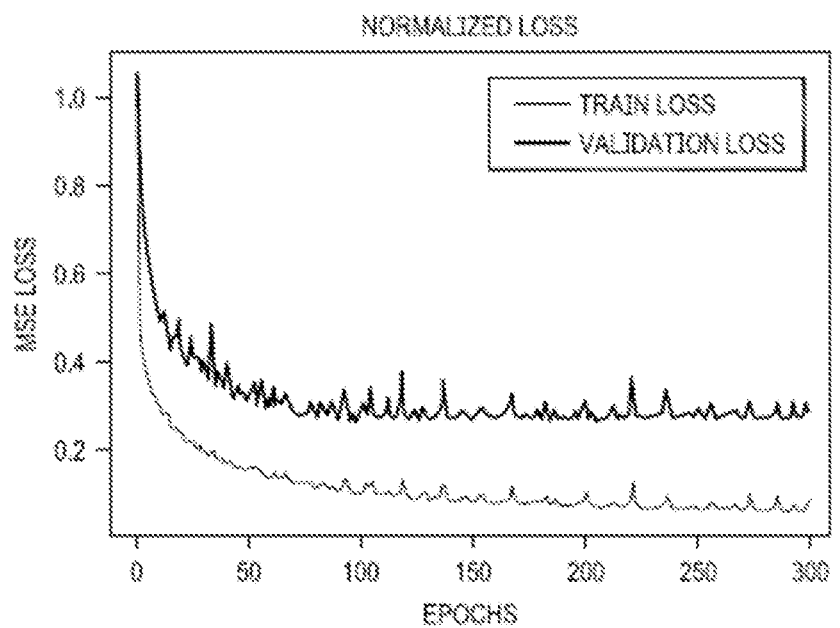
FIGS. 8A-8C illustrate example performance of an inception-based CNN-TCN on test data, in accordance with one or more implementations.
Figure 8A:
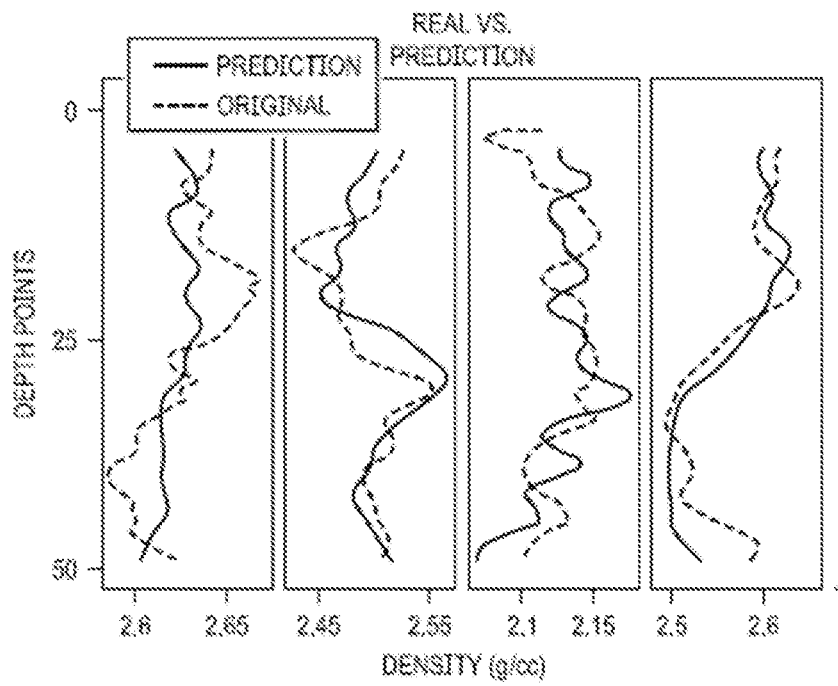
Figure 8B:
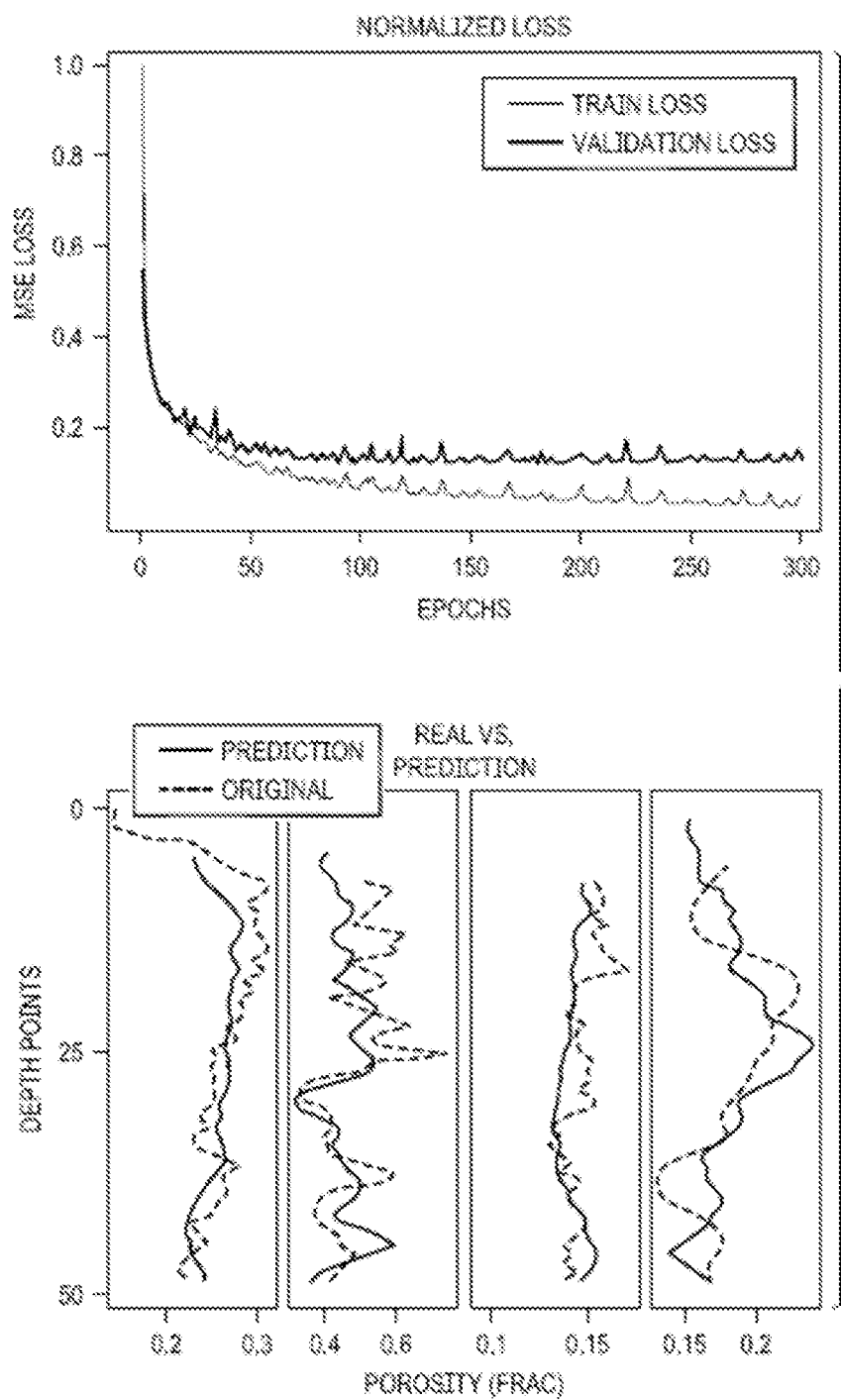
Figure 8C:
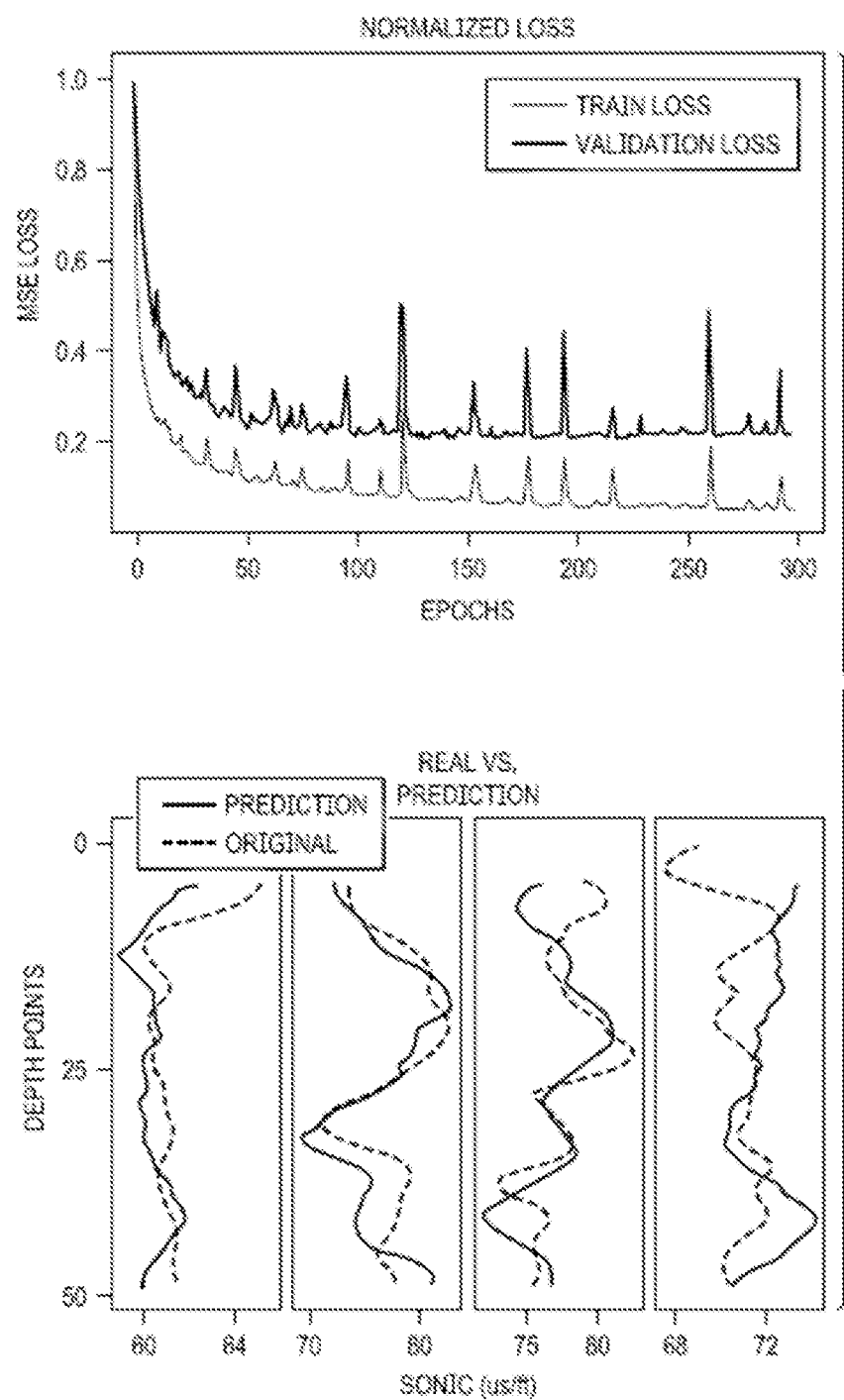

FIGS. 7A-7C illustrate example performance of an inception-based convolutional neural network (CNN) on test data, in accordance with one or more implementations. In particular, FIG. 7A illustrates performance of an inception-based CNN on test data where the loss is normalized by the maximum loss. The actual MSE values are shown in FIGS. 8A-8C. The predicted variable is density. In the second panel, the solid line represents the true test data and the dotted line is the prediction. Each of the four predictions in the second panel is an example. FIG. 7B illustrates performance of an inception-based CNN on test data where the predicted variable is neutron porosity. Although the correlation coefficients of predictions on test data are low, ranging between 0.4 and 0.6 depending on the model, the trends are captured in both the inception-based CNN and inception-based CNN-TCN models as seen in FIGS. 7A-7C. FIG. 7C illustrates performance of an inception-based CNN on test data where the predicted variable is compressional sonic data.

FIGS. 8A-8C illustrate example performance of an inception-based CNN-TCN on test data, in accordance with one or more implementations. In particular, FIG. 8A shows performance of an inception-based CNN-TCN on test data where the loss is normalized by the maximum loss. The actual MSE values are given in FIGS. 8A-8C. The predicted variable is density. FIG. 8B shows performance of an inception-based CNN-TCN on test data where the predicted variable is neutron porosity. FIG. 8C shows performance of an inception-based CNN-TCN on test data where the predicted variable is compressional sonic data. Each of the four predictions in the second panel is an example.

Figure 9A:
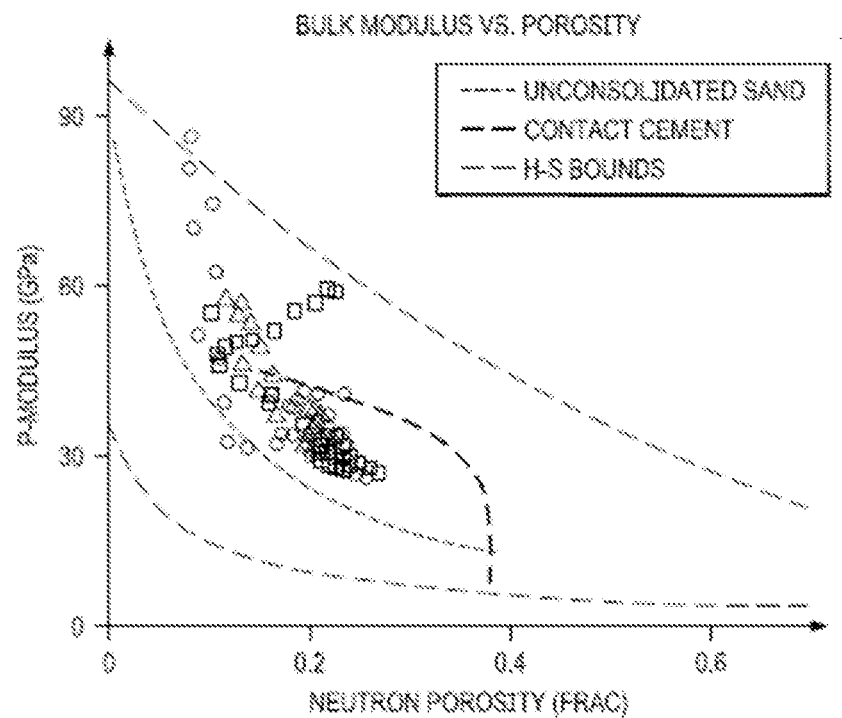
FIGS. 9A-9B illustrate example model performance, in accordance with one or more implementations.
Figure 9A:
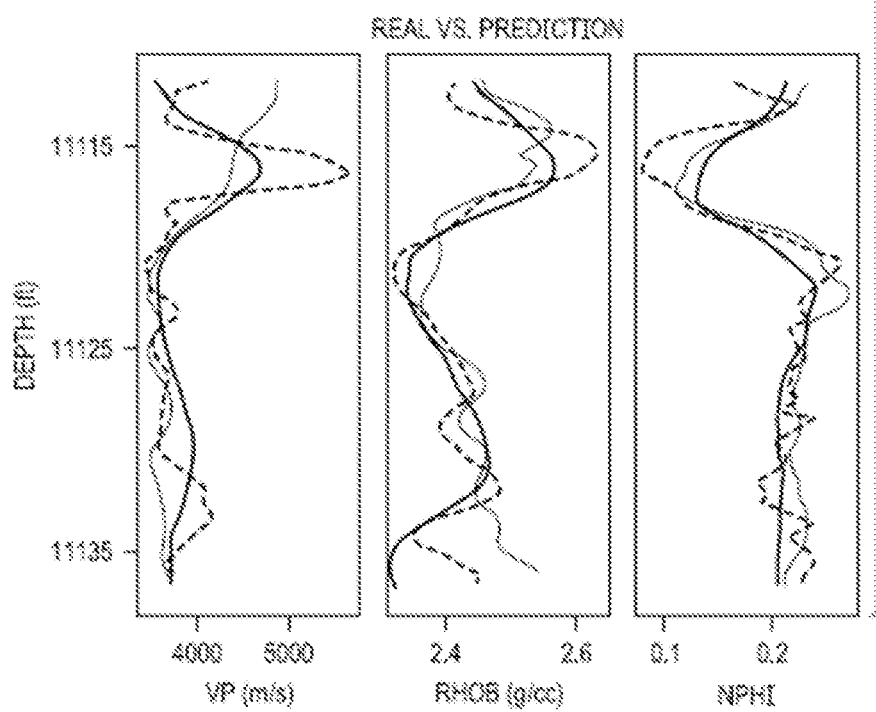
Figure 9B:
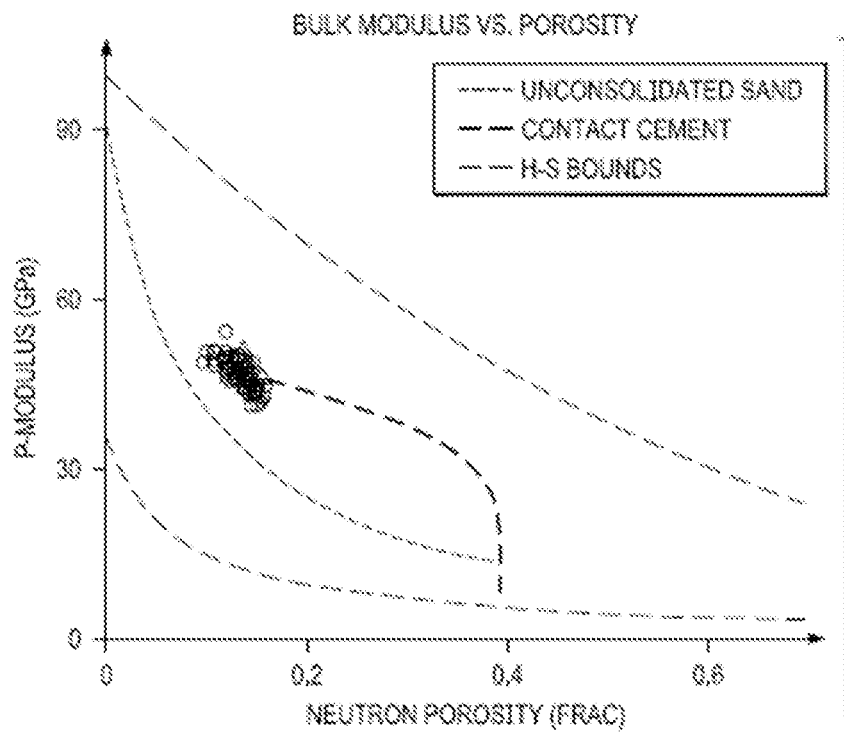
Figure 9B:
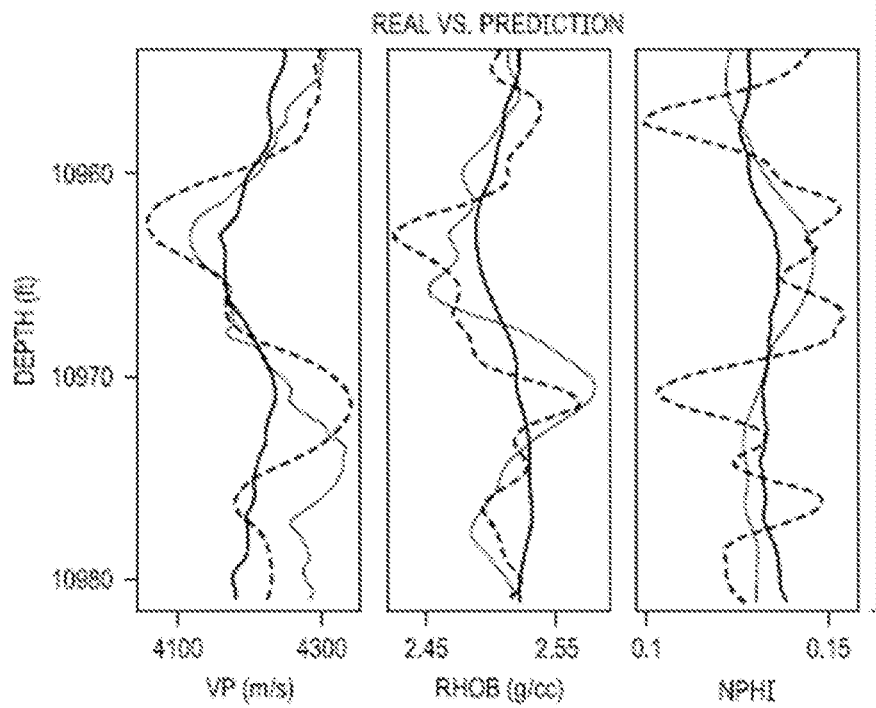

FIGS. 9A-9B illustrate example model performance, in accordance with one or more implementations. In some implementations, the computer system determines the mechanical properties of the geological formation using the TCN based on the sequences obtained from the features of the data. A display device of the computer system generates a graphical representation of the mechanical properties of the geological formation. The predicted trends are physically consistent across the predicted variables in both networks, as shown in FIGS. 9A-9B. For example, an increase in density is typically coupled with an increase in compressional sonic values and a decrease in porosity. FIGS. 9A-9B show a crossplot of P-modulus vs. porosity along with rock physics models and bounds. The predictions lie within their expected lithological range. In other words, sandstones are not predicted as shale or limestone and vice versa. In particular, FIGS. 9A-9B show the model performance including the original test data, inception-based CNN predictions, and the inception-based CNN-TCN predictions. The data in the right panel is used to generate the left panel. The crossplot has generic rock physics models such as the un-consolidated sand model, contact cement model, and the "Hashin-Strikman" bounds as reference for understanding the data. FIGS. 9A-9B show the clean fractured sandstone of the "Hugen Formation" and the massive sandstone cemented with silica and clay of the "Heimdal formation."

In some implementations, the mechanical properties include one or more of compressional sonic properties, shear sonic properties, density of the geological formation, porosity of the geological formation, an unconfined compressive strength, a Young's modulus, or a Poisson's ratio. Reducing the mean square error cost function results in predictions better than increasing the correlation coefficient or reducing both the MSE and maximizing the correlation coefficient of the predictions with different weights. The normalized loss shows a +90% decrease in loss over 300 epochs. Even with regularization, following TCN to CNN makes it harder for the network to generalize to the test data as shown in the loss deviations between training and validation data in FIGS. 7A-7C.

Figure 10:
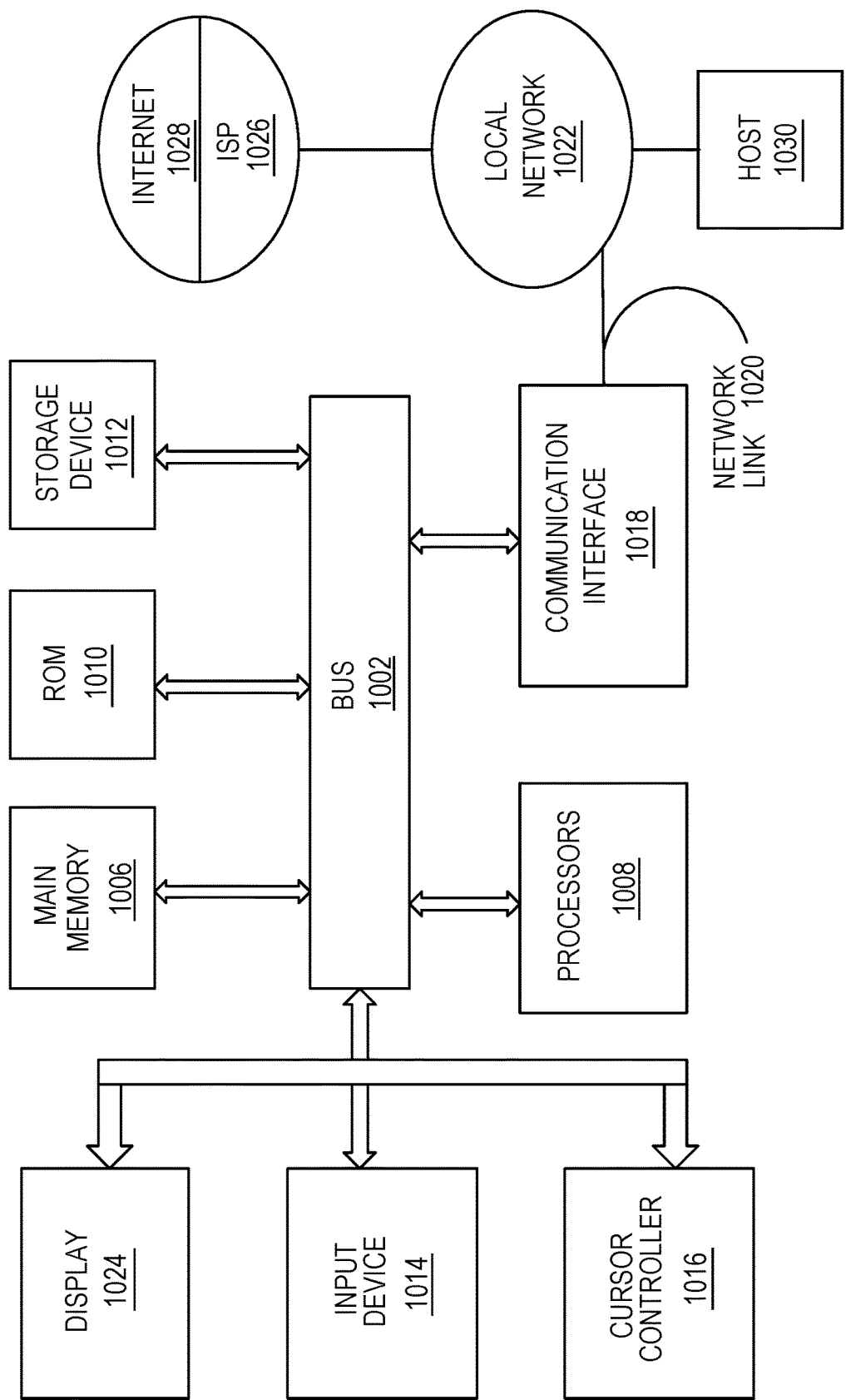
FIG. 10 illustrates an example machine for determining mechanical properties of a geological formation using deep learning, in accordance with one or more implementations.

FIG. 10 illustrates an example machine for determining mechanical properties of a geological formation using deep learning, in accordance with one or more implementations. In the example implementation, the computer system is a special purpose computing device. The special-purpose computing device is hard-wired or includes digital electronic devices such as one or more application-specific integrated circuits (ASICs) or field programmable gate arrays (FPGAs) that are persistently programmed to perform the techniques herein, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system includes a bus 1002 or other communication mechanism for communicating information, and one or more computer hardware processors 1008 coupled with the bus 1002 for processing information. The hardware processors 1008 are, for example, general-purpose microprocessors. The computer system also includes a main memory 1006, such as a random-access memory (RAM) or other dynamic storage device, coupled to the bus 1002 for storing information and instructions to be executed by processors 1008. In one implementation, the main memory 1006 is used for storing temporary variables or other intermediate information during execution of instructions to be executed by the processors 1008. Such instructions, when stored in non-transitory storage media accessible to the processors 1008, render the computer system into a special-purpose machine that is customized to perform the operations specified in the instructions.

In an embodiment, the computer system further includes a read only memory (ROM) 1010 or other static storage device coupled to the bus 1002 for storing static information and instructions for the processors 1008. A storage device 1012, such as a magnetic disk, optical disk, solid-state drive, or three-dimensional cross point memory is provided and coupled to the bus 1002 for storing information and instructions.

In an embodiment, the computer system is coupled via the bus 1002 to a display 1024, such as a cathode ray tube (CRT), a liquid crystal display (LCD), plasma display, light emitting diode (LED) display, or an organic light emitting diode (OLED) display for displaying information to a computer user. An input device 1014, including alphanumeric and other keys, is coupled to bus 1002 for communicating information and command selections to the processors 1008. Another type of user input device is a cursor controller 1016, such as a mouse, a trackball, a touch-enabled display, or cursor direction keys for communicating direction information and command selections to the processors 1008 and for controlling cursor movement on the display 1024. This input device typically has two degrees of freedom in two axes, a first axis (e.g., x-axis) and a second axis (e.g., y-axis), that allows the device to specify positions in a plane.

According to one embodiment, the techniques herein are performed by the computer system in response to the processors 1008 executing one or more sequences of one or more instructions contained in the main memory 1006. Such instructions are read into the main memory 1006 from another storage medium, such as the storage device 1012. Execution of the sequences of instructions contained in the main memory 1006 causes the processors 1008 to perform the process steps described herein. In alternative embodiments, hard-wired circuitry is used in place of or in combination with software instructions.

The term "storage media" as used herein refers to any non-transitory media that store data or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 1012. Volatile media includes dynamic memory, such as the main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that include the bus 1002. Transmission media can also take the form of acoustic or light waves, such as those generated during radio-wave and infrared data communications.

In an embodiment, various forms of media are involved in carrying one or more sequences of one or more instructions to the processors 1008 for execution. For example, the instructions are initially carried on a magnetic disk or solid-state drive of a remote computer. The remote computer loads the instructions into its dynamic memory and send the instructions over a telephone line using a modem. A modem local to the computer system receives the data on the telephone line and use an infrared transmitter to convert the data to an infrared signal. An infrared detector receives the data carried in the infrared signal and appropriate circuitry places the data on the bus 1002. The bus 1002 carries the data to the main memory 1006, from which processors 1008 retrieves and executes the instructions. The instructions received by the main memory 1006 can optionally be stored on the storage device 1012 either before or after execution by processors 1008.

The computer system also includes a communication interface 1018 coupled to the bus 1002. The communication interface 1018 provides a two-way data communication coupling to a network link 820 that is connected to a local network 1022. For example, the communication interface 1018 is an integrated service digital network (ISDN) card, cable modem, satellite modem, or a modem to provide a data communication connection to a corresponding type of telephone line. As another example, the communication interface 1018 is a local area network (LAN) card to provide a data communication connection to a compatible LAN. In some implementations, wireless links are also implemented. In any such implementation, the communication interface 1018 sends and receives electrical, electromagnetic, or optical signals that carry digital data streams representing various types of information.

The network link 1020 typically provides data communication through one or more networks to other data devices. For example, the network link 1020 provides a connection through the local network 1022 to a host computer 830 or to a cloud data center or equipment operated by an Internet Service Provider (ISP) 1026. The ISP 1026 in turn provides data communication services through the world-wide packet data communication network now commonly referred to as the "Internet" 1028. The local network 1022 and Internet 1028 both use electrical, electromagnetic or optical signals that carry digital data streams. The signals through the various networks and the signals on the network link 1020 and through the communication interface 1018, which carry the digital data to and from the computer system, are example forms of transmission media.

The computer system sends messages and receives data, including program code, through the network(s), the network link 1020, and the communication interface 1018. In an embodiment, the computer system receives code for processing. The received code is executed by the processors 1008 as it is received, and/or stored in storage device 1012, or other non-volatile storage for later execution.

Figure 11:
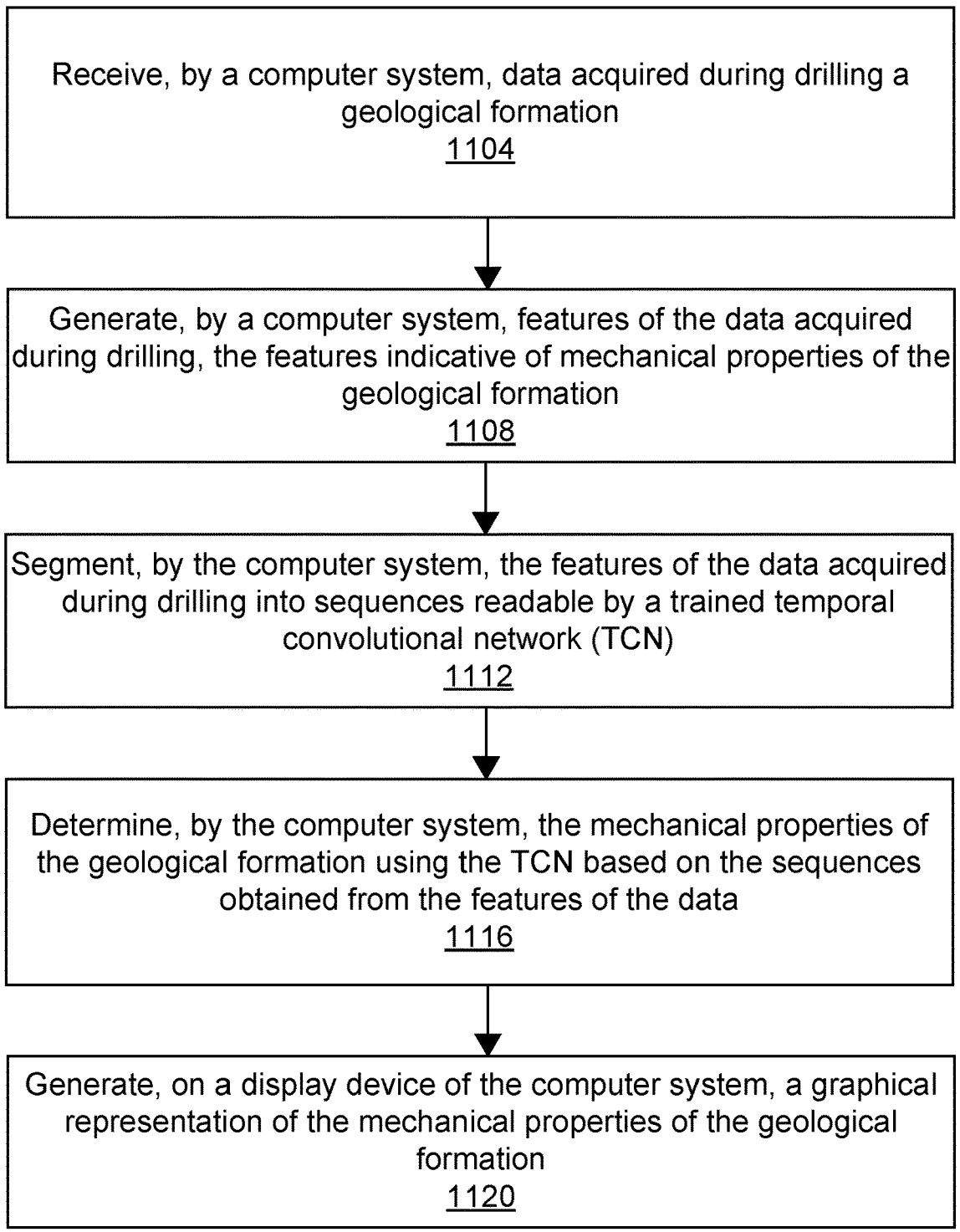
FIG. 11 illustrates a process for determining mechanical properties of a geological formation using deep learning, in accordance with one or more implementations.

FIG. 11 illustrates a process for determining mechanical properties of a geological formation using deep learning, in accordance with one or more implementations. In some implementations, the process is performed by the computer system illustrated and described in more detail with reference to FIG. 10.

In step 1104, the computer system receives data acquired during drilling a geological formation. The implementations disclosed herein predict mechanical logs of the subsurface (for example, velocity and density) using the data acquired conventionally while drilling, such as WOB or RPM. Geophysical logs, such as density, porosity, and sonic data are important for subsurface resource estimation and exploitation. However, these wireline petro-physical measurements are selectively deployed as they are expensive to acquire. Meanwhile, drilling information is recorded per drilled well. Hence, the implementations provide a predictive tool for wireline log prediction from drilling data to assist decisions on data acquisition, especially for delineation and production wells.

In step 1108, the computer system generates features of the data acquired during drilling. The features are indicative of mechanical properties of the geological formation. In some implementations, deep learning models are used to learn complex relationships between input features. For example, all of the available features, such as ROP, stand-pipe pressure, or bit size can be used, and the model can learn which variables are more important. In other implementations, the number of input features are reduced, such that the model learns the mapping between more-important input features and the mechanical logs. For example, drilling parameters are sometimes controlled and only make sense when viewed together with other drilling parameters. The drilling design might plan for the rate of penetration to be a particular value over a certain period of time, while other parameters are changed to maintain the rate of penetration planned by the drilling design. Thus, studying the interaction between features and their effect on the response variables is important for picking influential features.

In step 1112, the computer system segments the features of the data acquired during drilling into sequences readable by a trained temporal convolutional network (TCN). The sequence model can optionally be preceded by a cascade of inception based convolutional neural networks. Rather than use one long sequence from each well as input to the model, the data is segmented into many smaller sequences. First, using one long sequence for each well would result in a very small number of samples for training, which is insufficient to train the deep neural network. Second, as the distance from the drill bit increases, the less relevant the information becomes. In experiments, a 50-sample sliding window was used (corresponding to 25 feet) to extract overlapping mini-sequences from the wells, which was both geologically meaningful and would enable the network to better find patterns in the noisy drilling data. The output of this step is a number of arrays of data that can be used to train the neural network. The first array contains multivariate input sequences (for example GR and drilling parameters for one implementation) while the second contains sequences of the target to predict (density, sonic logs, or other logs). The target array can either be univariate or multivariate. The input and target arrays are typically split into training and validation datasets, with the validation data being used to evaluate the generalization of model as it is not used during training.

In step 1116, the computer system determines the mechanical properties of the geological formation using the TCN based on the sequences obtained from the features of the data. A deep learning sequence modelling approach is used to convert the input sequences (drilling parameters and GR logs) to an output sequence of the desired mechanical property. When only a TCN is used, stacked 1D dilated convolutions enable the network to build a large receptive field (the size of the input that affects a particular feature or output) using only a few layers. With conventional 1D convolutions, the receptive field of the network grows linearly with the number of convolutional layers. Dilated convolutions essentially skip values in the input to apply the convolution filter over a size larger than the filter length (see FIG. 5). This is controlled by the dilation factor (d). A dilation factor of d=1 is normal convolution, while d=4 means that only every fourth value is used by the filter (three input values are skipped). The dilation factor can increase exponentially (d=1, 2, 4, 8 . . . ), which results in the receptive field also increasing exponentially for a fixed filter width (in this example the filter size is two).

In step 1120, a display device 1024 of the computer system generates a graphical representation of the mechanical properties of the geological formation. The display device 1024 is illustrated and described in more detail with reference to FIG. 10. The implementations disclosed herein thus provide a workflow for predicting petrophysical logs from drilling parameters. The workflow includes data augmentation and feature engineering using DGSA. The experimental results show that the models disclosed can predict geophysical logs from drilling data (see FIGS. 9A-9B). The trends captured are physically consistent across density, porosity, and compressional sonic data. The predictions are within reasonable lithological ranges.

What is claimed is:
1. A method comprising:
receiving, by at least one processor, data acquired during drilling a geological formation;
generating, by the at least one processor, features of the data acquired during drilling, the features indicative of mechanical properties of the geological formation;
segmenting, by the at least one processor, the features of the data acquired during drilling into sequences readable by a trained temporal convolutional network (TCN);
predicting, by the at least one processor, subsequences of a synthetic geophysical log corresponding to the geological formation using the TCN based on the sequences obtained from the features of the data; and
outputting, by the at least one processor, a final synthetic log by combining the predicted subsequences.

2. The method of claim 1, wherein the data acquired during drilling comprises at least one of a Gamma Ray log, a rate of penetration, a number of revolutions per minute, a weight on bit, a stand-pipe pressure, a hook height, a hook load, fluid flow values, a type of a drill bit, near-bit vibrations, a rotational drilling speed, a mud motor speed, a drilling torque, an area of the drill bit, a temperature of a drilling mud, a weight of the drilling mud, a nozzle diameter of the drill bit, or a number of cutters of the drill bit.

3. The method of claim 1, wherein the mechanical properties comprise at least one of compressional sonic properties, shear sonic properties, density of the geological formation, porosity of the geological formation, an unconfined compressive strength, a Young's modulus, or a Poisson's ratio.

4. The method of claim 1, further comprising:
performing, by the computer system, sensitivity analysis on the features of the data acquired during drilling; and
ranking, by the computer system, the features with respect to the mechanical properties of the geological formation based on the sensitivity analysis.

5. The method of claim 1, further comprising capturing, by the computer system, geologic patterns using a convolutional inception model applied to the sequences obtained from the features of the data, wherein predicting the subsequences using the TCN is further based further on the geologic patterns.

6. The method of claim 1, further comprising training, by the computer system, the TCN to generate the mechanical properties of the geological formation based on the sequences obtained from the features of the data.

7. The method of claim 1, further comprising:
permuting, by the computer system, at least one feature of the features of the data acquired during drilling; and determining, by the computer system, a change in the mechanical properties of the geological formation responsive to permuting the at least one feature.

8. A non-transitory computer-readable storage medium storing instructions executable by a computer system, the instructions when executed by the computer system cause the computer system to:
receive data acquired during drilling a geological formation;
generate features of the data acquired during drilling, the features indicative of mechanical properties of the geological formation;
segment the features of the data acquired during drilling into sequences readable by a trained temporal convolutional network (TCN);
predict subsequences of a synthetic geophysical log corresponding to the geological formation using the TCN based on the sequences obtained from the features of the data; and
output a final synthetic log by combining the predicted subsequences.

9. The non-transitory computer-readable storage medium of claim 8, wherein the data acquired during drilling comprises at least one of a Gamma Ray log, a rate of penetration, a number of revolutions per minute, a weight on bit, a stand-pipe pressure, a hook height, a hook load, fluid flow values, a type of a drill bit, near-bit vibrations, a rotational drilling speed, a mud motor speed, a drilling torque, an area of the drill bit, a temperature of a drilling mud, a weight of the drilling mud, a nozzle diameter of the drill bit, or a number of cutters of the drill bit.

10. The non-transitory computer-readable storage medium of claim 8, wherein the mechanical properties comprise at least one of compressional sonic properties, shear sonic properties, density of the geological formation, porosity of the geological formation, an unconfined compressive strength, a Young's modulus, or a Poisson's ratio.

11. The non-transitory computer-readable storage medium of claim 8, wherein the instructions further cause the computer system to:
perform sensitivity analysis on the features of the data acquired during drilling; and
rank the features with respect to the mechanical properties of the geological formation based on the sensitivity analysis.

12. The non-transitory computer-readable storage medium of claim 8, wherein the instructions further cause the computer system to capture geologic patterns using a convolutional inception model applied to the sequences obtained from the features of the data, wherein predicting the subsequences using the TCN is further based further on the geologic patterns.

13. The non-transitory computer-readable storage medium of claim 8, wherein the instructions further cause the computer system to train the TCN to generate the mechanical properties of the geological formation based on the sequences obtained from the features of the data.

14. The non-transitory computer-readable storage medium of claim 8, wherein the instructions further cause the computer system to:
permute at least one feature of the features of the data acquired during drilling; and
determine a change in the mechanical properties of the geological formation responsive to permuting the at least one feature.

15. A computer system comprising:
one or more computer processors; and
a non-transitory computer-readable storage medium storing instructions executable by the one or more computer processors, the instructions when executed by the one or more computer processors cause the one or more computer processors to:
receive data acquired during drilling a geological formation;
generate features of the data acquired during drilling, the features indicative of mechanical properties of the geological formation;
segment the features of the data acquired during drilling into sequences readable by a trained temporal convolutional network (TCN);
predict subsequences of a synthetic geophysical log corresponding to the geological formation using the TCN based on the sequences obtained from the features of the data; and
output a final synthetic log by combining the predicted subsequences.

16. The computer system of claim 15, wherein the data acquired during drilling comprises at least one of a Gamma Ray log, a rate of penetration, a number of revolutions per minute, a weight on bit, a stand-pipe pressure, a hook height, a hook load, fluid flow values, a type of a drill bit, near-bit vibrations, a rotational drilling speed, a mud motor speed, a drilling torque, an area of the drill bit, a temperature of a drilling mud, a weight of the drilling mud, a nozzle diameter of the drill bit, or a number of cutters of the drill bit.

17. The computer system of claim 15, wherein the mechanical properties comprise at least one of compressional sonic properties, shear sonic properties, density of the geological formation, porosity of the geological formation, an unconfined compressive strength, a Young's modulus, or a Poisson's ratio.

18. The computer system of claim 15, wherein the instructions further cause the computer system to:
perform sensitivity analysis on the features of the data acquired during drilling; and
rank the features with respect to the mechanical properties of the geological formation based on the sensitivity analysis.

19. The computer system of claim 15, wherein the instructions further cause the computer system to wherein the instructions further cause the computer system to capture geologic patterns using a convolutional inception model applied to the sequences obtained from the features of the data, wherein predicting the subsequences using the TCN is further based further on the geologic patterns.

20. The computer system of claim 15, wherein the instructions further cause the computer system to train the TCN to generate the mechanical properties of the geological formation based on the sequences obtained from the features of the data.

* * * * *

UNITED STATES PATENT AND TRADEMARK OFFICE
CERTIFICATE OF CORRECTION

PATENT NO. : 11,796,714 B2
APPLICATION NO. : 17/546570
DATED : October 24, 2023
INVENTOR(S) : Robert Smith et al.

It is certified that error appears in the above-identified patent and that said Letters Patent is hereby corrected as shown below:

In the Claims

In Column 16, Line 59, Claim 5, please replace "based further" with -- based --.

In Column 17, Line 52, Claim 12, please replace "based further" with -- based --.

In Column 18, Lines 49-51, Claim 19, please replace "wherein the instructions further cause the computer system to wherein the instructions further cause the computer system to" with -- wherein the instructions further cause the computer system to --.

In Column 18, Line 54, Claim 19, please replace "based further" with -- based --.

Signed and Sealed this
Thirtieth Day of January, 2024

Katherine Kelly Vidal
*Director of the United States Patent and Trademark Office*